US012799347B2

(12) United States Patent
Qiu et al.

(10) Patent No.: US 12,799,347 B2
(45) Date of Patent: Nov. 17, 2026

(54) ELECTRONIC TELECOMMUNICATIONS ARTICLES AND COMPOSITIONS COMPRISING FLUORINATED CURING AGENTS

(71) Applicant: 3M INNOVATIVE PROPERTIES COMPANY, St. Paul, MN (US)

(72) Inventors: Zai-Ming Qiu, Woodbury, MN (US); Naiyong Jing, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 391 days.

(21) Appl. No.: 18/555,140

(22) PCT Filed: Apr. 1, 2022

(86) PCT No.: PCT/IB2022/053074
§ 371 (c)(1),
(2) Date: Oct. 12, 2023

(87) PCT Pub. No.: WO2022/234358
PCT Pub. Date: Nov. 10, 2022

(65) Prior Publication Data

US 2024/0218202 A1 Jul. 4, 2024

Related U.S. Application Data

(60) Provisional application No. 63/184,379, filed on May 5, 2021.

(51) Int. Cl.

| | |
|---|---|
| ***C09D 127/18*** | (2006.01) |
| ***C09D 7/20*** | (2018.01) |
| ***H01B 3/44*** | (2006.01) |

(52) U.S. Cl.
CPC ............ *C09D 127/18* (2013.01); *C09D 7/20* (2018.01); *H01B 3/445* (2013.01)

(58) Field of Classification Search
None
See application file for complete search history.

(56) References Cited

U.S. PATENT DOCUMENTS

| | | | |
|---|---|---|---|
| 3,250,807 | A | 5/1966 | Gerhard et al. |
| 3,250,808 | A | 5/1966 | Moore, Jr. et al. |

(Continued)

FOREIGN PATENT DOCUMENTS

| | | | |
|---|---|---|---|
| CN | 1173883 | A | 2/1998 |
| CN | 1871275 | A | 11/2006 |

(Continued)

OTHER PUBLICATIONS

3M Dynamar Rubber Curative RC5125, 2014, 3M Safety Data Sheet, 2014, 11 pages.

(Continued)

*Primary Examiner* — Ramsey Zacharia
(74) *Attorney, Agent, or Firm* — Carolyn A. Fischer

(57) ABSTRACT

Electronic telecommunication article is described comprising a crosslinked fluoropolymer layer. The crosslinked fluoropolymer layer comprises the reaction product of a fluoropolymer and a fluorinated curing agent. Suitable fluorinated curing agent may comprise amine groups or at least one amine group in combination with one or more alkoxy silane groups. Also described are compositions comprising a fluoropolymer and a fluorinated curing agent and optionally fluorinated solvent; as well as methods of making coated substrates and articles.

11 Claims, 5 Drawing Sheets

(56) References Cited

U.S. PATENT DOCUMENTS

| | | | | |
|---|---|---|---|---|
| 3,499,859 | A | 3/1970 | Matherly et al. | |
| 4,349,650 | A | 9/1982 | Krespan | |
| 4,859,836 | A | 8/1989 | Lunk et al. | |
| 5,274,159 | A | 12/1993 | Pellerite et al. | |
| 5,463,021 | A | 10/1995 | Beyer et al. | |
| 5,542,217 | A | 8/1996 | Larivee, Jr. | |
| 5,708,131 | A | 1/1998 | Morgan | |
| 5,880,204 | A | 3/1999 | McCarthy et al. | |
| 5,883,177 | A | 3/1999 | Colaianna et al. | |
| 6,248,823 | B1 | 6/2001 | Hrivnak et al. | |
| 6,720,360 | B1 | 4/2004 | Grootaert et al. | |
| 7,288,619 | B2 | 10/2007 | Qiu et al. | |
| 7,892,280 | B2 | 2/2011 | Pathak | |
| 8,776,837 | B2 | 7/2014 | Mckeen | |
| 8,969,500 | B2 | 3/2015 | Hintzer et al. | |
| 11,254,764 | B2 | 2/2022 | Verschuere | |
| 2004/0024134 | A1 | 2/2004 | Grootaert et al. | |
| 2004/0266985 | A1 | 12/2004 | Howell et al. | |
| 2005/0171257 | A1 | 8/2005 | Wakui | |
| 2005/0261431 | A1 | 11/2005 | Takahashi et al. | |
| 2006/0147723 | A1 | 7/2006 | Jing et al. | |
| 2009/0018275 | A1 | 1/2009 | Campbell et al. | |
| 2009/0038821 | A1 | 2/2009 | Sato et al. | |
| 2009/0087646 | A1 | 4/2009 | Sirejacob | |
| 2012/0154487 | A1 | 6/2012 | Sambhy et al. | |
| 2014/0066572 | A1 | 3/2014 | Corveleyn et al. | |
| 2014/0227533 | A1 | 8/2014 | Murakami et al. | |
| 2015/0004861 | A1* | 1/2015 | Gervasi ................ | C09D 171/00 524/502 |
| 2015/0296614 | A1 | 10/2015 | Williams et al. | |
| 2016/0194512 | A1 | 7/2016 | Bandi et al. | |
| 2017/0022440 | A1 | 1/2017 | Yu et al. | |
| 2019/0136109 | A1 | 5/2019 | Agapov et al. | |
| 2019/0144700 | A1 | 5/2019 | Hosoda et al. | |
| 2019/0177574 | A1 | 6/2019 | Takeda | |
| 2020/0048420 | A1 | 2/2020 | Hosoda et al. | |
| 2020/0317948 | A1 | 10/2020 | Terada et al. | |
| 2021/0139687 | A1 | 5/2021 | Jing et al. | |
| 2024/0227357 | A1 | 7/2024 | Jing et al. | |

FOREIGN PATENT DOCUMENTS

| | | | |
|---|---|---|---|
| CN | 101679562 | A | 3/2010 |
| CN | 102559051 | A | 7/2012 |
| CN | 108047189 | A | 5/2018 |
| CN | 109535362 | A | 3/2019 |
| CN | 111019482 | B | 9/2021 |
| EP | 0540730 | B1 | 12/1997 |
| EP | 1127935 | A1 | 8/2001 |
| EP | 1155055 | B2 | 4/2009 |
| EP | 1997795 | B1 | 3/2016 |
| EP | 2617738 | B1 | 5/2021 |
| JP | 61127641 | A | 6/1986 |
| JP | 07202362 | A | 8/1995 |
| JP | 2019189545 | A | 10/2019 |
| TW | 201829718 | A | 8/2018 |
| WO | 200008076 | A1 | 2/2000 |
| WO | 2002004534 | A2 | 1/2002 |
| WO | 2002044534 | A1 | 6/2002 |
| WO | 2005017017 | A1 | 2/2005 |
| WO | 2005049687 | A1 | 6/2005 |
| WO | 20060083409 | A | 7/2006 |
| WO | 2006102383 | A1 | 9/2006 |
| WO | 2007266606 | A | 10/2007 |
| WO | 2008094758 | A1 | 8/2008 |
| WO | 2011043973 | A1 | 4/2011 |
| WO | 2012106172 | A2 | 8/2012 |
| WO | 2014075246 | A1 | 5/2014 |
| WO | 2015066868 | A1 | 5/2015 |
| WO | 2015088784 | A2 | 6/2015 |
| WO | 2015134435 | A1 | 9/2015 |
| WO | 2015187413 | A1 | 12/2015 |
| WO | 2016017801 | A1 | 2/2016 |
| WO | 2016069674 | A1 | 5/2016 |
| WO | 2016159102 | A1 | 10/2016 |
| WO | 2016189000 | A1 | 12/2016 |
| WO | 2017004496 | A1 | 1/2017 |
| WO | 2017070172 | A1 | 4/2017 |
| WO | 2017094710 | A1 | 6/2017 |
| WO | 20180044790 | A | 5/2018 |
| WO | 2018107017 | A1 | 6/2018 |
| WO | 2019018346 | A1 | 1/2019 |
| WO | 2019161153 | A1 | 8/2019 |
| WO | 2019203243 | A1 | 10/2019 |
| WO | 2019230568 | A1 | 12/2019 |
| WO | 2019239320 | A1 | 12/2019 |
| WO | 2019239322 | A1 | 12/2019 |
| WO | 2019239568 | A1 | 12/2019 |
| WO | 2019241186 | A1 | 12/2019 |
| WO | 2020111009 | A1 | 6/2020 |
| WO | 2020111010 | A1 | 6/2020 |
| WO | 2020132203 | A1 | 6/2020 |
| WO | 2020137879 | A1 | 7/2020 |
| WO | 2020145133 | A1 | 7/2020 |
| WO | 2021088198 | A1 | 5/2021 |
| WO | 2021090111 | A1 | 5/2021 |
| WO | 2021091864 | A1 | 5/2021 |
| WO | 2022135000 | A1 | 6/2022 |
| WO | 2022234358 | A1 | 11/2022 |
| WO | 2022234363 | A1 | 11/2022 |
| WO | 2022234364 | A1 | 11/2022 |
| WO | 2022234365 | A1 | 11/2022 |
| WO | 2023042004 | A1 | 3/2023 |
| WO | 2023042005 | A1 | 3/2023 |

OTHER PUBLICATIONS

3M Dyneon Fluoroelastomers Compounding Guide, 3M Advanced Materials Division, 28 pages.

3M Dyneon Fluoroelastomers Product Guide,3M Advanced Materials Division, 2017, 20 pages.

3M Novec 7300 Engineered Fluid, 16 pages.

3M™ Fused Silica as a Polymeric Filler, 3M Advanced Materials Division, 2018, 2 pages.

Ameduri, "Fluoroelastomers: synthesis, properties and applications", Progress in Polymer Science, Feb. 2001, vol. 26, No. 1, pp. 105-187.

Amorphous Hucsrapolymer Technical Documnnis, AGC Inc. Chemicals Company, May 2018, 1 page.

E, R and D glass properties, Saint-Gobain Vetrotex, 2 pages.

Endo, "Crystallization in Binary Blends of Polytetrafluoroethylene with Perfluorinated Tetrafluoroethylene Copolymer", Polymer Journal, 2004, vol. 36, No. 9, pp. 716-727, XP055008334.

Fibertec, Microglass 9007D, 1 page.

Fibertec, Microglass 9110, 1 page.

Fibertec, Microglass 9132, 1 page.

Hintzer, "Ullmann's Encyclopedia of Industrial Chemistry", 2013, 7th Edition—Chapter—Fluoropolymers, Organic, pp. 4-6.

International Search Report for PCT International Application No. PCT/IB2019/054868, mailed on Oct. 30, 2019, 6 pages.

International Search Report for PCT International Application No. PCT/IB2019/054870, mailed on Oct. 11, 2019, 4 pages.

International Search Report for PCT International Application No. PCT/IB2020/058660, mailed on Apr. 19, 2021, 4 pages.

International Search Report for PCT International Application No. PCT/IB2020/060061, mailed on Dec. 7, 2020, 4 pages.

International Search Report for PCT International Application No. PCT/IB2022/053074, mailed on Jun. 30, 2022, 4 pages.

International Search Report for PCT International Application No. PCT/US2019/036460, mailed on Sep. 20, 2019, 6 pages.

Jing, "Fluoropolymer Compositions Comprising Amorphous Fluoropolymer and Crystalline Fluoropolymer Suitable for Copper and Electronic Telecommunications Articles", PCT Application No. IB2022/053284, filed Apr. 7, 2022, 69 pages.

Jing, "Fluoropolymer Compositions Comprising Fluoropolymer with Polymerized Unsaturated Fluorinated Alkyl Ether Suitable For Copper And Electronic Telecommunications Articles", PCT Application No. IB2022/053281, filed Apr. 7, 2022, 47 pages.

(56) References Cited

OTHER PUBLICATIONS

Jing, "Fluoropolymer Compositions Comprising Uncrosslinked Fluoropolymer Suitable For Copper And Electronic Telecommunications Articles", PCT Application No. IB2022/053241, filed Apr. 6, 2022, 46 pages.
Khaleel, "Design, Fabrication, and Testing of Flexible Antennas", INTECH, 2013, pp. 363-383.
Milker, "New Generation of Multifunctional Crosslinkers", 28 pages.
MIN-U-SIL, Fine Ground Silica, US Silica, Sep. 2017, 1 page.
Nittobo New Glass fabric for PCB, Nitto Boseki Co., Ltd., Nov. 2011, 28 pages.
Oliver, "Low-Loss Materials in High Frequency Electronics and the Challenges of Measurement", DuPont, Feb. 2015, 45 pages.
Owens, "Estimation of the Surface Free Energy of Polymers", Journal of Applied Polymer Science, 1969, vol. 13, pp. 1741-1747.
Owens, "Understanding the stability and environmental characteristics of a sustainable halon alternative", 3M Performance Materials, 12 pages.
Perez, CYTOP™, May 2018, 4 pages.
Polymide, Wikipedia, 5 pages.
Qiu, "Photolithographic Patterning of Cytop with Limited Contact Angle Degradation", Micromachines, 2018, vol. 9, No. 10, pp. 509(1)-509(10).
Qiu, "Electronic Telecommunications Articles and Compositions Comprising Fluroinated Curing Agents", PCT Application No. IB2022/053074, filed Apr. 1, 2022, 66 pages.
Review of Polyimides Used in the Manufacturing of Micro Systems, NASA Center for AeroSpace Information (CASI), Apr. 2007, 16 pages.
Rodriguez, "Atmospheric chemistry of HFE-7300 and HFE-7500: Temperature dependent kinetics, atmospheric lifetimes, infrared spectra and global warming potentials", Atmospheric Environment, 2014, vol. 96, pp. 145-153.
Runt, "Polymer blends and copolymer", Handbook of Thermal Analysis and Calorimetry, Applications to Polymers and Plastics, 2002, vol. 3, pp. 273-294.
Scheirs, Modern Fluoropolymers, 397-418 (1997).
Scheirs, Modern Fluoropolymers, 541-555 (1997).
Silane Coupling Agents, Connecting Across Boundaries, Gelestinc., 2006, 12 pages.
Tanaka, "Miscibility and Isomorphic Cocrystallization in Blends of Ferroelectric Copolymers of Vinylidene Fluoride and Trifluoroethylene", Journal of Polymer Science: Part B: Polymer Physics, 1990, vol. 28, pp. 2183-2198.
Types of Antenna Coatings, Telewave, Inc., Sep. 2017, 5 pages.
Uses and Emissions of Liquid PFC Heat Transfer Fluids from the Electronics Sector, Office of Air and Radiation, Office of Atmospheric Programs, Climate Change Division, 2004, pp. 1-37.
Weldon, "Flex for 5G—Why Materials Matter", DuPont, 2018, 16 pages.

* cited by examiner

ELECTRONIC TELECOMMUNICATIONS ARTICLES AND COMPOSITIONS COMPRISING FLUORINATED CURING AGENTS

SUMMARY

In one embodiment, an electronic telecommunication article is described comprising a crosslinked fluoropolymer layer. The crosslinked fluoropolymer layer comprises the reaction product of a fluoropolymer and a fluorinated curing agent. Illustrative electronic communication articles include integrated circuits, printed circuit boards, antennas, and optical fiber cables.

Fluorinated curing agents also can have better solubility with fluoropolymers than non-fluorinated curing agents. Fluorinated curing agents can have better solubility in fluorinated solvents than non-fluorinated curing agents. Fluorinated curing agents can also provide improved properties in comparison to non-fluorinated curing agents. For example, in some embodiments, the presence of fluorinated curing agents provides lower Dk and Df, which is important for high signal transmission speed and low signal loss of electronic communication articles. The presence of fluorinated crosslinkers can provide reduced moisture uptake, coefficient of hydroscopic absorption, and/or diffusions rate. The presence of fluorinated crosslinkers can also provide an increased coefficient of thermal expansion. The use of fluorinated crosslinkers can also provide processing advantages.

In some embodiments, the fluorinated curing agent comprises one or more (e.g. secondary) amine groups.

In some embodiments, fluorinated agent has the formula:

$$Rf—[L^1—(NR^1R^2)_n—NHR^3]_p$$

wherein:

Rf is a (per)fluorinated group;

$L^1$ is a divalent linking group or a covalent bond;

$R^1$ is independently hydrogen, an alkyl group having from 1 to 8 carbon atoms, an aminoalkyl group having from 2 to 8 carbon atoms, a hydroxyalkyl group having from 2 to 8 carbon atoms, or $-L^1Rf$;

$R^2$ independently represents an alkylene group having from 2 to 8 carbon atoms;

$R^3$ is hydrogen, an alkyl group having 1 to 4 carbon atoms, or $-L^1Rf$;

n is at least 1; and p is 1 or two.

In some embodiments, the fluorinated curing agent comprises one or more (e.g. secondary) amine groups and one or more alkoxy silane groups.

In some embodiments, the fluorinated agent has the formula:

$$Rf^1—(L^3)—[NR^1R^2]_n—SiR^4_m(OR^5)_{3-m})_p$$

wherein $Rf^1$ is a (per)fluorinated group;

$L^3$ is independently a divalent linking group or a covalent bond;

$R^1$ is independently H, an alkyl group having from 1 to 8 carbon atoms, an aminoalkyl group having from 2 to 8 carbon atoms, a hydroxyalkyl group having from 2 to 8 carbon atoms, or $-L^1Rf$;

$R^2$ independently represents an alkylene group having from 2 to 8 carbon atoms;

$R^4$ is independently alkylene, arylene, or a combination thereof, $R^5$ is hydrogen, an alkyl group having 1 to 4 carbon atoms;

n is at least one;

m is 0 or 1; and p is 1 or 2.

Also described are compositions comprising a fluoropolymer and a fluorinated curing agent. In some embodiments, the composition further comprises a fluorinated solvent.

Also described are methods of making an (e.g. electronic communications) article. In one embodiment, the method comprises providing a film or coating solution comprising a fluoropolymer; and one or more fluorinated curing agents; and applying the film or coating solution to a substrate.

DETAILED DESCRIPTION

Figure 1:
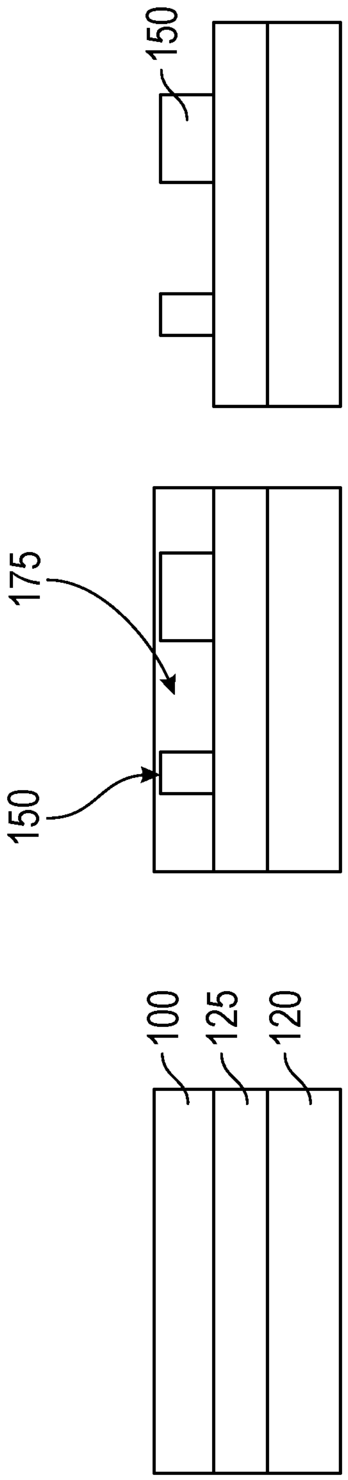
FIG. 1 is a schematic cross-sectional diagram of a patterned fluoropolymer layer.

Presently described are certain fluoropolymer compositions (e.g. films and coatings) comprising fluorinated curing agents.

Electronic Telecommunication Articles

The fluoropolymer compositions described herein are suitable for use in electronic telecommunication articles. As used herein, electronic refers to devices using the electromagnetic spectrum (e.g. electons, photons); whereas telecommunication is the transmission of signs, signals, messages, words, writings, images and sounds or information of any nature by wire, radio, optical or other electromagnetic systems.

Polyimide materials are used extensively in the electronic telecommunications industry. The structure of poly-oxydiphenylene-pyromellitimide, "Kapton" is as follows:

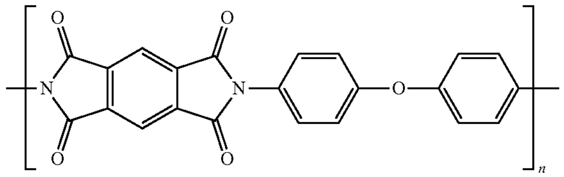

Polyimide films exhibited good insulating properties with dielectric constants values in the range of 2.78-3.48 and dielectric loss between 0.01 and 0.03 at 1 Hz at room temperature.

Perfluoropolymers can have substantially lower dielectric constants and dielectric loss properties than polyimides which is particularly important for fifth generation cellular network technology ("5G") articles. For example, crosslinked fluoropolymer compositions described herein can have a dielectric constant (Dk) of less than 2.75, 2.70, 2.65, 2.60, 2.55, 2.50, 2.45, 2.40, 2.35, 2.30, 2.25, 2.20, 2.15, 2.10, 2.05, 2.00, or 1.95. In some embodiments, the dielectric constant is at least 2.02, 2.03, 2.04, 2.05. Further, the crosslinked fluoropolymer compositions described herein can have a low dielectric loss, typically less than 0.01, 0.009, 0.008, 0.007, 0.006, 0.005, 0.004, 0.003, 0.002, 0.001, 0.0009, 0.0008, 0.0007, 0.0006, 0.0005, 0.0004, 0.0003. In some embodiments, the dielectric loss is at least 0.00022, 0.00023, 0.00024, 0.00025. The dielectric properties (e.g. constant and loss) can be determined according to the test method described in the examples. As the number of non-fluorine atoms decreases (e.g. number of carbon-hydrogen and/or carbon-oxygen bonds increases) the dielectric constant and dielectric loss also typically increases.

However, perfluoropolymers have not been used in place of polyimides is various electronic telecomnunications articles are least in part by the lack of perfluoropolymer materials that can be crosslinked in combination with providing lower dielectric constants and dielectric loss properties. Crosslinked perfluoropolymer materials can have improved mechanical properties in comparison to uncrosslinked perfluoropolymer materials. Hence, the perfluoropolymer compositions described are suitable for use in place of polyimides in various electronic telecommunication articles.

In one embodiment, the electronic telecommunication article is an integrated circuit or in other words a silicon chip or microchip, i.e. a microscopic electronic circuit array formed by the fabrication of various electrical and electronic components (resistors, capacitors, transistors, and so on) on a semiconductor material (silicon) wafer. Various integrated circuit designs have been described in the literature.

In some embodiments, particularly when it is desirable to apply a thin fluoropolymer film to the substrate, the method comprises applying a coating solution (e.g. spin coating) to a substrate.

The coating solution comprises a fluorinated solvent and a fluoropolymer. The method typically comprises removing the fluorinated solvent (e.g. by evaporation). In this embodiment, the substrate or (e.g. $SiO_2$) coated surface thereof that comes in contact with the solvent is substantially insoluble in the fluorinated solvent of the coating solution. Further, the method typically comprises recycling, or in other words reusing, the fluorinated solvent of the coating solution.

In some embodiments, the fluoropolymer may be characterized are a patterned fluoropolymer layer. A patterned fluoropolymer lay may be formed by any suitable additive or subtractive method known in the art.

With reference to FIG. 1, in one embodiment, a method of forming a patterned fluoropolymer layer is described comprising applying a fluoropolymer film 100 to a substrate (e.g. silicon wafer 120, the passivation (e.g. $SiO_2$) layer 125 coated surface thereof or copper); and selectively removing portions of the fluoropolymer film. For example, portions 175 of the fluoropolymer layer may be removed with (e.g. solventless) methods, such as laser ablation. Fluoropolymer portions 150 remain. thereby forming a patterned fluoropolymer layer.

The patterned fluoropolymer layer can be used to fabricate other layers such as a circuit of patterned electrode materials. Suitable electrode materials and deposition methods are known in the art. Such electrode materials include, for example, inorganic or organic materials, or composites of the two. Exemplary electrode materials include polyaniline, polypyrrole, poly(3,4-ethylenedioxythiophene) (PEDOT) or doped conjugated polymers, further dispersions or pastes of graphite or particles of metal such as Au, Ag, Cu, Al, Ni or their mixtures as well as sputter-coated or evaporated metals such as Cu, Cr, Pt/Pd, Ag, Au, Mg, Ca, Li or mixtures or metal oxides such as indium tin oxide (ITO), F-doped ITO, GZO (gallium doped zinc oxide), or AZO (aluminium doped zinc oxide). Organometallic precursors may also be used and deposited from a liquid phase.

Figure 2:
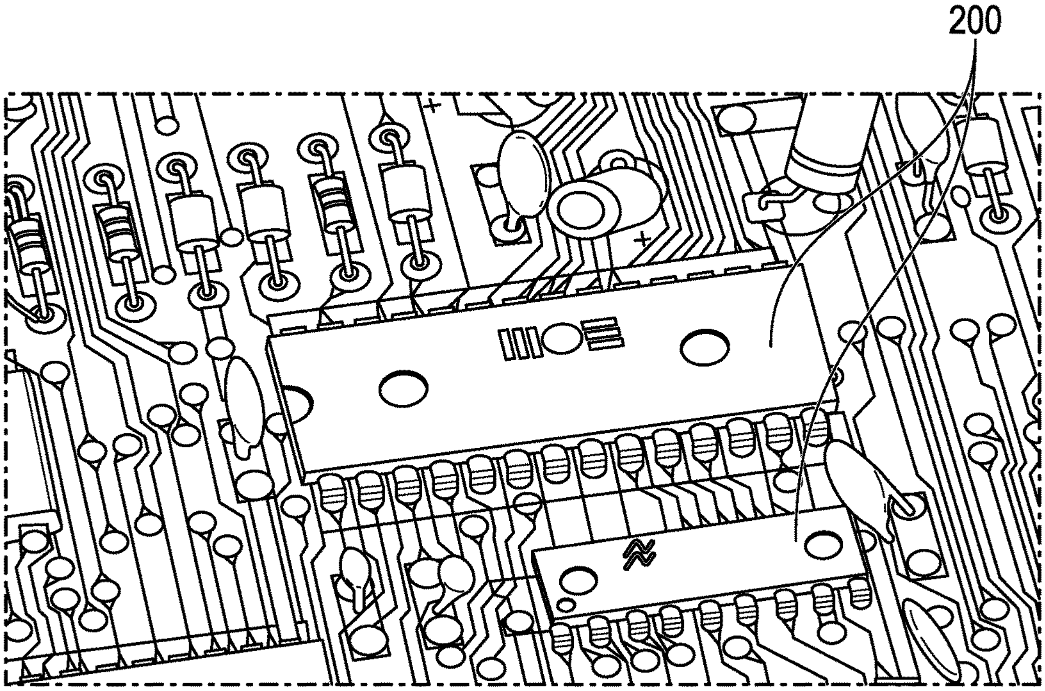
FIG. 2 is a perspective view of an illustrative printed circuit board (PCB) including integrated circuits.

In another embodiment, the fluoropolymer (e.g. photoresist) layer can be disposed upon a metal (e.g. copper) substrate in the manufacture of a printed circuit board (PCB). An illustrative perspective view of a printed circuit board is depicted in FIG. 2. A printed circuit board, or PCB, is used to mechanically support and electrically connect electronic components using conductive pathways, tracks or signal traces etched from (e.g. copper) metal sheets laminated onto a non-conductive substrate. Such boards are typically made from an insulating material such as glass fiber reinforced (fiberglass) epoxy resin or paper reinforced phenolic resin. The pathways for electricity are typically made from a negative photoresist, as previously described. Thus, in this embodiment, the crosslinked fluoropolymer is disposed on the surface of the (e.g. copper) metal substrate. Portions of uncrosslinked fluoropolymer are removed to form the conductive (e.g. copper) pathways. Crosslinked fluoropolymer (e.g. photoresist) remain present, disposed between the conductive (e.g. copper) pathways of the printed circuit board. Solder is used to mount components on the surface of these boards. In some embodiments, the printed circuit board further comprises integrated circuits 200, as depicted in FIG. 2. Printed circuit board assemblies have an application in almost every electronic article including computers, computer printers, televisions, and cell phones.

In another embodiment, the crosslinked fluoropolymer film described herein can be utilized as an insulating layer, passivation layer, and/or protective layer in the manufacture of integrated circuits.

Figure 3A:
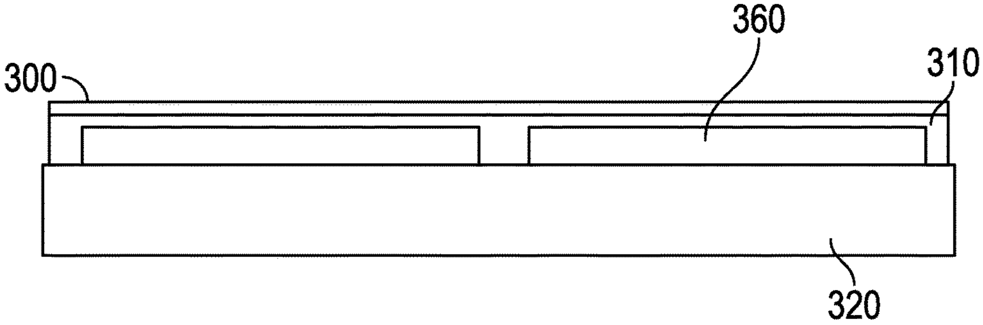
FIGS. 3A and 3B are cross-sectional diagrams of illustrative fluoropolymer passivation and insulating layers.

With reference to FIG. 3A, in one embodiment, a thin fluoropolymer film 300 (e.g. typically having a thickness less than 50, 40, or 30 nm) can be disposed on a passivation layer 310 (e.g. $SiO_2$) disposed on an electrode patterned 360 silicon chip 320.

Figure 3B:
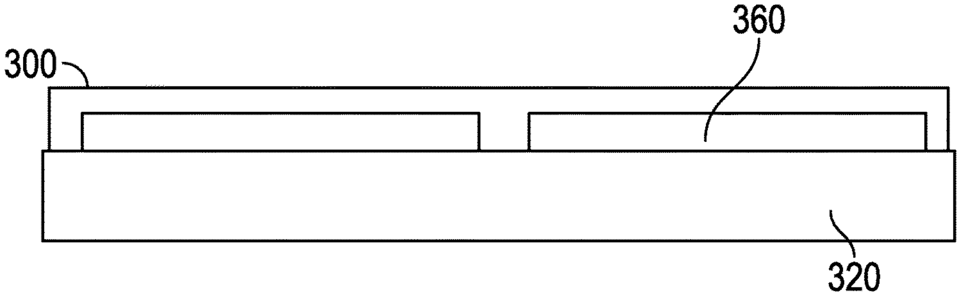

With reference to FIG. 3B, in another embodiment, a thicker fluoropolymer film 300 (e.g. typically having a thickness of at least 100, 200, 300, 400, 500 nm) can be disposed on an electrode patterned 360 silicon chip 320. In this embodiment, the fluoropolymer layer may function as both a passivation layer and an insulating layer. Passivation is the use of a thin coating to provide electrical stability by isolating the transistor surface from electrical and chemical conditions of the environment.

In another embodiment, the crosslinked fluoropolymer film described herein can be utilized as a substrate for antennas. The antenna of the transmitter emits (e.g. high frequency) energy into space while the antenna of the receiver catches this and converts it into electricity.

Figure 4:
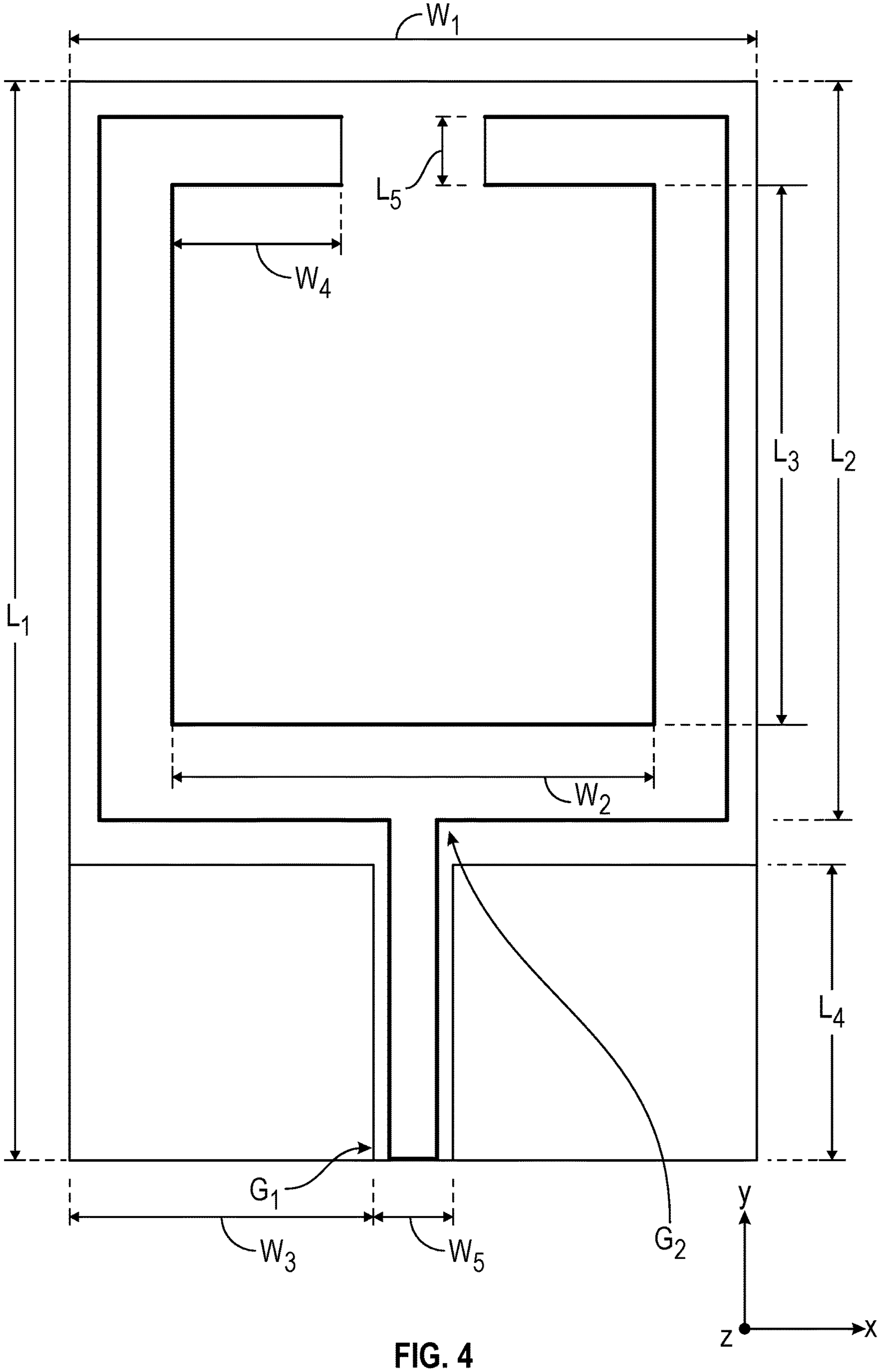
FIG. 4 is a plan view of an illustrative antenna of a mobile computer device.

The patterned electrodes of an antenna can also be formed from photolithography. Screen printing, flexography, and ink jet printing can also be utilized to form the electrode pattern as known in the art. Various antenna designs for (e.g. mobile) computing devices (smart phone, tablet, laptop, desktop) have been described in the literature. One representative split ring monopole antenna is depicted in FIG. 4 having the following dimensions in microns.

| | | | |
|---|---|---|---|
| $L_1$ | 38 | $W_1$ | 25 |
| $L_2$ | 26 | $W_2$ | 18 |
| $L_3$ | 19 | $W_3$ | 10.5 |
| $L_4$ | 9.5 | $W_4$ | 6.5 |
| $L_5$ | 3 | $W_5$ | 2 |
| $G_1$ | 2 | $G_2$ | 0.5 |

Figure 5A:
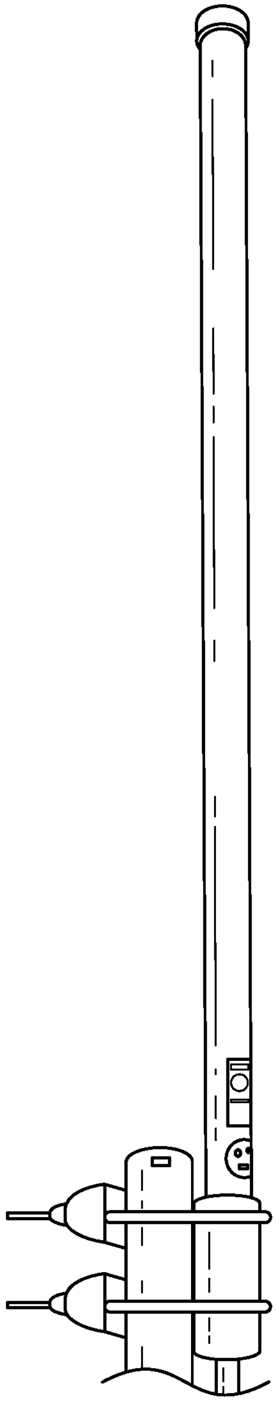
FIGS. 5A and 5B are perspective views of illustrative antennas of a telecommunications tower.
Figure 5B:
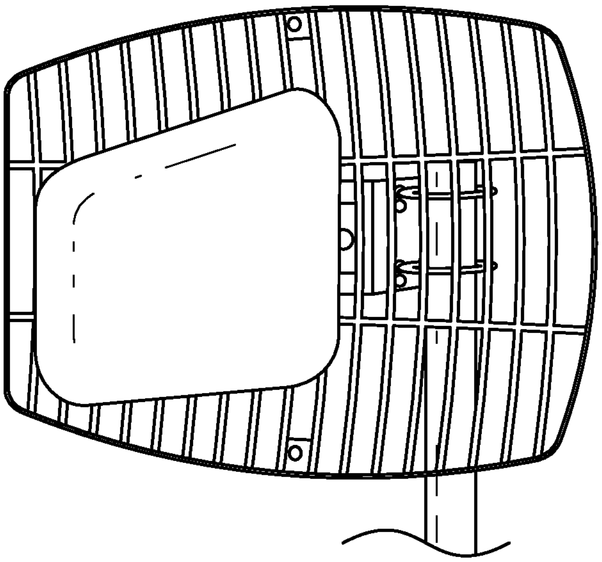

The low dielectric fluoropolymer films and coatings described herein can also be utilized as insulating and protective layers of transmitter antennas of cell towers and other (e.g. outdoor) as well as indoor structures. There are two major types of antennas used in cell towers. FIG. 5A is depicts a representative omnidirectional (e.g. dipole) antenna used to transmit/receive in any direction. FIG. 5B is a representative directional antenna used to transmit/receive in particular desired direction only such as horn antennas of circular and rectangular type.

Figure 6:
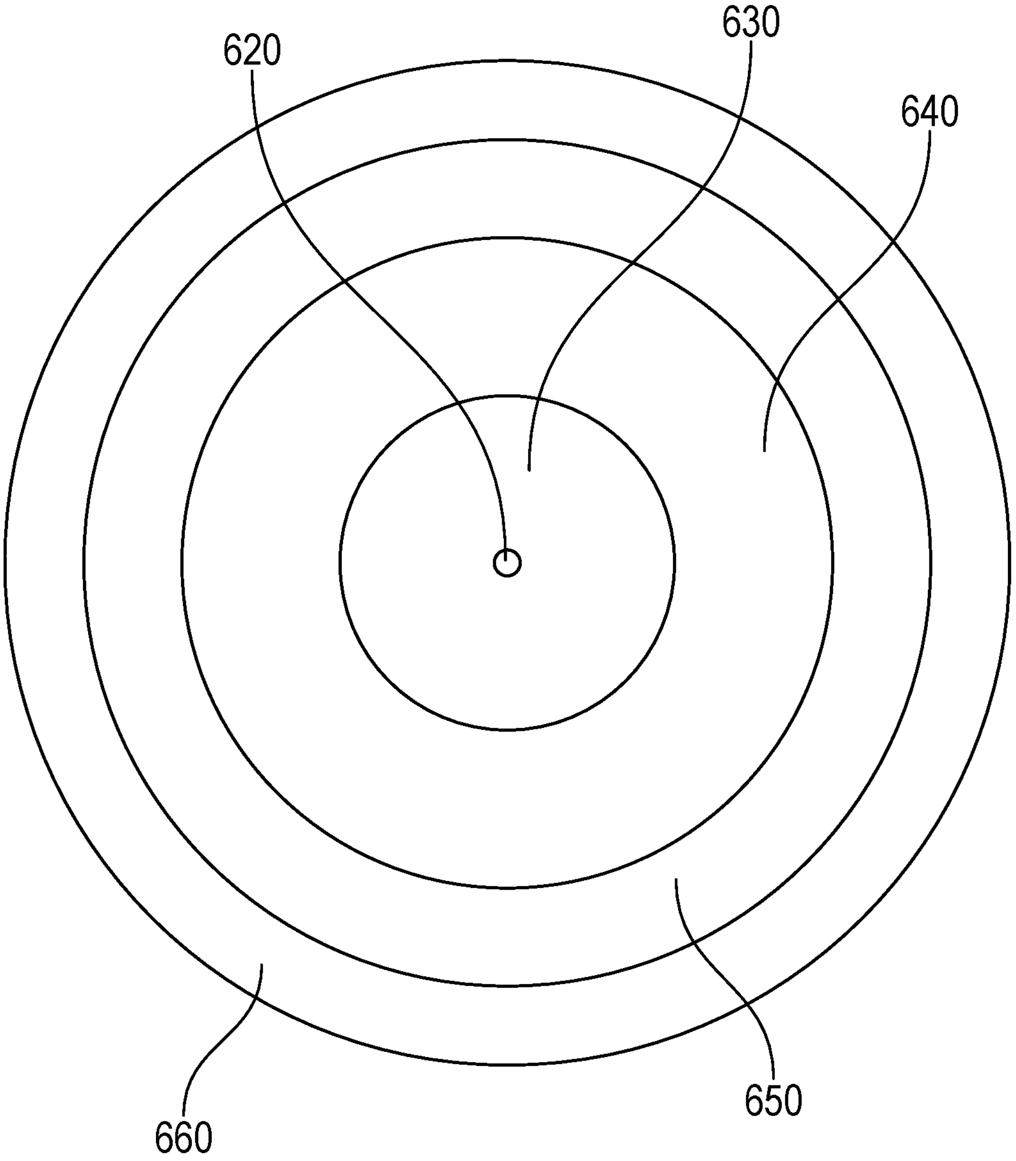
FIG. 6 is a cross-sections diagram of an illustrative optical fiber cable.

In another embodiment, the low dielectric fluoropolymer compositions described herein may also be utilized in fiber optic cable. With reference to FIG. 6, fiber optic cable typically includes five main components: the core which is typically highly pure (e.g. silica) glass 620, cladding 630, coating (e.g. first inner protective layer) 640, strengthening fibers 650, and outer jacket (i.e. second outer protective layer) 660. The function of the cladding is to provide a lower refractive index at the core interface in order to cause reflection within the core so that light waves are transmitted through the fiber. The coating over the cladding is typically present to reinforce the fiber core, help absorb shocks, and provide extra protection against excessive cable bends. The low dielectric fluoropolymer compositions described herein can be used as the cladding, coating, outer jacket, or combination thereof.

In other embodiments, the low dielectric fluoropolymer films and coatings described herein can also be utilized for flexible cables and as an insulating film on magnet wire. For example, in a laptop computer, the cable that connects the main logic board to the display (which must flex every time the laptop is opened or closed) may be a low dielectric fluoropolymer composition as described herein with copper conductors.

The fluoropolymer films and coatings are typically not a sealing component of equipment used in wafer and chip production.

One of ordinary skill in the art appreciates that the low dielectric fluoropolymer compositions described herein can be utilized in various electronic telecommunication articles, particularly in place of polyimide, and such utility is not limited to the specific articles described herein.

Fluoropolymers

The fluoropolymer comprises a fluoropolymer are derived predominantly or exclusively from perfluorinated comonomers including tetrafluoroethene (TFE) and one or more of the unsaturated (e.g. alkenyl, vinyl) perfluorinated alkyl ethers. "Predominantly" as used herein means at least 80, 85, or 90% by weight based on the total weight of the fluoropolymer, of the polymerized units of the fluoropolymer are derived from such perfluorinated comonomers such as tetrafluoroethene (TFE) and one or more unsaturated perfluorinated alkyl ethers. In some embodiments, the fluoropolymer comprises at least 81, 82, 83, 84, 85, 86, 87, 88, 90, 91, 92, 93, 94, 95, 96, or 97% by weight or greater of such perfluorinated comonomers, based on the total weight of the fluoropolymer. The fluoropolymers may contain at least 40, 45, or 50% by weight of polymerized units derived from TFE. In some embodiments, the maximum amount of polymerized units derived from TFE is no greater than 60% or 55% by weight.

In some favored embodiments, the one or more unsaturated perfluorinated alkyl ethers are selected from the general formula:

$$R_f\text{—O—}(CF_2)_n\text{—}CF\text{=}CF_2$$

wherein n is 1 (allyl ether) or 0 (vinyl ether) and $R_f$ represents a perfluoroalkyl residue which may be interrupted once or more than once by an oxygen atom. $R_f$ may contain up to 10 carbon atoms, e.g. 1, 2, 3, 4, 5, 6, 7, 8, 9 or 10 carbon atoms. Preferably $R_f$ contains up to 8, more preferably up to 6 carbon atoms and most preferably 3 or 4 carbon atoms. In one embodiment $R_f$ has 3 carbon atoms. In another embodiment $R_f$ has 1 carbon atom. $R_f$ may be linear or branched, and it may contain or not contain a cyclic unit. Specific examples of $R_f$ include residues with one or more ether functions including but not limited to:

$—(CF_2)—O—C_3F_7$, $—(CF_2)_2—O—C_2F_5$, $—(CF_2)_{r3}—O—CF_3$, $—(CF_2—O)—C_3F_7$, $—(CF_2—O)_2\text{-}C_2F_5$, $—(CF_2—O)_3—CF_3$, $—(CF_2CF_2—O)—C_3F_7$, $—(CF_2CF_2—O)_2—C_2F_5$, $—(CF_2CF_2—O)_3—CF_3$, Other specific examples for $R_f$ include residues that do not contain an ether function and include but are not limited to $—C_4F_9$; $—C_3F_7$, $—C_2F_5$, $—CF_3$, wherein the $C_4$ and $C_3$ residues may be branched or linear, but preferably are linear.

The unsaturated perfluorinated alkyl either may comprise allyl or vinyl groups. Both have C—C double bonds. Whereas a perfluorinated vinyl group is $CF_2=CF—$; a perfluorinated allyl group is $CF_2=CFCF_2—$.

Specific examples of suitable perfluorinated alkyl vinyl ethers (PAVE's) and perfluorinated alkyl allyl ethers (PAAE's) include but are not limited to perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, $CF_2=CF—O—CF_2—O—C_2F_5$, $CF_2=CF—O—CF_2—O—C_3F_7$, $CF_3—(CF_2)_2—O—CF(CF_3)—CF_2—O—CF(CF_3)—CF_2—O—CF=CF_2$ and their allyl ether homologues. Specific examples of allyl ethers include $CF_2=CF—CF_2—O—CF_3$, $CF_2=CF—CF_2—O—C_3F_7$, $CF_2=CF—CF_2—O—(CF_3)_3—O—CF_3$.

Further examples include but are not limited to the vinyl ether described in European Patent EP 1,997,795.

In some embodiments, the (e.g. amorphous) fluoropolymer comprises polymerized units of at least one allyl ether, such as alkyl vinyl ether is $CF_2=CFCF_2OCF_2CF_2CF_3$.

Such fluoropolymers are described in WO 2019/161153; incorporated herein by reference.

Perfluorinated ethers as described above are commercially available, for example from Anles Ltd., St. Petersburg, Russia and other companies or may be prepared according to methods described in U.S. Pat. No. 4,349,650 (Krespan) or European Patent EP 1,997,795, or by modifications thereof as known to a skilled person.

In some embodiments, the one or more unsaturated perfluorinated alkyl ethers comprises unsaturated cyclic perfluorinated alkyl ethers, such as 2,2-bistrifluoromethyl-4,5-difluoro-1,3 dioxole. In other embodiments, the fluoropolymer is substantially free of unsaturated cyclic perfluorinated alkyl ethers, such as 2,2-bistrifluoromethyl-4,5-difluoro-1,3 dioxole. By substantially free it is meant that the amount is zero or sufficiently low such the fluoropolymer properties are about the same.

The fluoropolymer typically comprises polymerized units derived from one or more of the unsaturated perfluorinated alkyl ethers (PAVE) (e.g. PMVE, PAAE or a combination thereof), in an amount of at least 10, 15, 20, 25, 30, 45, or 50% by weight, based on the total polymerized monomer units of the fluoropolymer. When the amount of polymerized units derived from one or more of the unsaturated perfluorinated alkyl ethers is less than 30 wt. %, the amorphous fluoropolymer typically comprises other comonomers such as HFP to reduce the crystallinity. In some embodiments, the fluoropolymer comprises no greater than 50, 45, 40, or 35% by weight of polymerized units derived from one or more of the unsaturated perfluorinated alkyl ethers (PMVE, PAAE or a combination thereof), based on the total polymerized monomer units of the fluoropolymer. The molar ratio of units derived from TFE to the perfluorinated alkyl ethers described above may be, for example, from 1:1 to 5:1. In some embodiments, the molar ratio ranges from 1.5:1 to 3:1.

In some embodiments, the one or more unsaturated perfluorinated alkyl ethers comprises unsaturated cyclic perfluorinated alkyl ethers, such as 2,2-bistrifluoromethyl-4,5-difluoro-1,3 dioxole. Amorphous fluoropolymer that comprise predominantly, or exclusively comprise, (e.g. repeating) polymerized units derived from two or more perfluorinated comonomers including tetrafluoroethene (TFE) and one or more unsaturated cyclic perfluorinated alkyl ethers, such as 2,2-bistrifluoromethyl-4,5-difluoro-1,3 dioxole are commercially available as "TEFLON™ AF", "CYTOP™", and "HYFLON™".

Fluoropolymers comprising a sufficient amount of polymerized units of one or more of the unsaturated perfluorinated alkyl ethers are typically amorphous fluoropolymers. As used herein, amorphous fluoropolymers are materials that contain essentially no crystallinity or possess no significant melting point (peak maximum) as determined by differential scanning calorimetry in accordance with DIN EN ISO 11357-3:2013-04 under nitrogen flow and a heating rate of 10° C./min. Typically, amorphous fluoropolymers have a glass transition temperature (Tg) of less than 26° C., less than 20° C., or less than 0° C., and for example from −40° C. to 20° C., or −50° C. to 15° C., or −55° C. to 10° C. The fluoropolymers may typically have a Mooney viscosity (ML 1+10 at 121° C.) of from about 2 to about 150, for example from 10 to 100, or from 20 to 70. For amorphous polymers containing cyclic perfluorinated alky ether units, the glass transition temperature is typically at least 70° C., 80° C., or 90° C., and may range up to 220° C., 250° C., 270° C., or 290° C. The MFI (297° C./5 kg) is between 0.1-1000 g/10 min.

The fluorine content of the fluoropolymer is typically at least 60, 65, 66, 67, 68, 69, or 70 wt. % of the fluoropolymer and typically no greater than 76, 75, 74, or 73 wt. %. The fluorine content may be achieved by selecting the comonomers and their amounts accordingly.

Such highly-fluorinated amorphous fluoropolymers typically do not dissolve to the extent of at least 1 wt. %, at room temperature and standard pressure, in a hydrogen-containing organic liquid (e.g., it does not dissolve in any of methyl ethyl ketone ("MEK"), tetrahydrofuran ("THF"), ethyl acetate or N-methyl pyrrolidinone ("NMP")).

The fluoropolymers may contain partially fluorinated or non-fluorinated comonomers and combinations thereof, although this is not preferred. Typical partially fluorinated comonomers include but are not limited to 1,1-difluoroethene (vinylidenefluoride, VDF) and vinyl fluoride (VF) or trifluorochloroethene or trichlorofluoroethene. Examples of non-fluorinated comonomers include but are not limited to ethene and propene. The amount of units derived from these comonomers include from 0 to 8% by weight based on the total weight of the fluoropolymer. In some embodiments, the concentration of such comonomer is no greater than 7, 6, 5, 4, 3, 2, or 1% by weight based on the total weight of the fluoropolymer.

In a preferred embodiment, the curable fluoropolymer is a perfluoroelastomer that comprises repeating units (exclusively) derived from the perfluorinated comonomers but may contain units derived from cure-site monomers and modifying monomers if desired. The cure-site monomers and modifying monomers may be partially fluorinated, not fluorinated or perfluorinated, and preferably are perfluorinated. The perfluoroelastomers may contain from 69 to 73, 74, or 75% fluorine by weight (based on the total amount of perfluoroelastomer). The fluorine content may be achieved by selecting the comonomers and their amounts accordingly.

The fluoropolymers can be prepared by methods known in the art, such as bulk, suspension, solution or aqueous emulsion polymerization. Various emulsifiers can be used as described in the art, including for example 3H-perfluoro-3-[(3-methoxy-propoxy)propanoic acid. For example, the polymerization process can be carried out by free radical polymerization of the monomers alone or as solutions, emulsions, or dispersions in an organic solvent or water. Seeded polymerizations may or may not be used. Curable fluoroelastomers that can be used also include commercially available fluoroelastomers, in particular perfluoroelastomers.

The fluoropolymers may have a monomodal or bi-modal or multi-modal weight distribution. The fluoropolymers may or may not have a core-shell structure. Core-shell polymers are polymers where towards the end of the polymerization, typically after at least 50% by mole of the comonomers are consumed, the comonomer composition or the ratio of the comonomers or the reaction speed is altered to create a shell of different composition.

Cure Sites

The fluoropolymer is preferably a curable fluoropolymer that contains one or more cure sites. Cure sites are functional groups that react in the presence of a curing agent or a curing system to cross-link the polymers. The cure sites are typically introduced by copolymerizing cure-site monomers, which are functional comonomers already containing the cure sites or precursors thereof. One indication of crosslinking is that the dried and cured coating composition is not soluble in the fluorinated solvent of the coating.

The cure sites may be introduced into the polymer by using cure site monomers, i.e. functional monomers as will be described below, functional chain-transfer agents and starter molecules. The fluoroelastomers may contain cure sites that are reactive to more than one class of curing agents.

The curable fluoroelastomers may also contain cure sites in the backbone, as pendent groups, or cure sites at a terminal position. Cure sites within the fluoropolymer backbone can be introduced by using a suitable cure-site monomer. Cure site monomers are monomers containing one or more functional groups that can act as cure sites or contain a precursor that can be converted into a cure site.

In some embodiments, the cure sites comprise iodine or bromine atoms.

Iodine-containing cure site end groups can be introduced by using an iodine-containing chain transfer agent in the polymerization. Iodine-containing chain transfer agents will be described below in greater detail. Halogenated redox systems as described below may be used to introduce iodine end groups.

In addition to iodine cures sites, other cure sites may also be present, for example Br-containing cure sites or cure sites containing one or more nitrile groups. Br-containing cure sites may be introduced by Br-containing cure-site monomers.

Examples of cure-site comonomers include for instance:

(a) bromo- or iodo-(per)fluoroalkyl-(per)fluorovinylethers, for example including those having the formula:

$$ZRf—O—CX{=}CX_2$$

wherein each X may be the same or different and represents H or F, Z is Br or I, Rf is a C1-C12 (per)fluoroalkylene, optionally containing chlorine and/or ether oxygen atoms. Suitable examples include $ZCF_2—O—CF{=}CF_2$, $ZCF_2CF_2—O—CF{=}CF_2$, $ZCF_2CF_2CF_2—O—CF{=}CF_2$, $CF_3CFZCF_2—O—CF{=}CF_2$ or $ZCF_2CF_2—O—CF_2CF_2CF_2—O—CF{=}CF_2$ wherein Z represents Br of I; and (b) bromo- or iodo perfluoroolefins such as those having the formula:

$$Z'—(Rf)r\text{-}CX{=}CX_2$$

wherein each X independently represents H or F, Z' is Br or I, Rf is a $C_1$-$C_{12}$ perfluoroalkylene, optionally containing chlorine atoms and r is 0 or 1; and (c) non-fluorinated bromo and iodo-olefins such as vinyl bromide, vinyl iodide, 4-bromo-1-butene and 4-iodo-1-butene.

Specific examples include but are not limited to compounds according to (b) wherein X is H, for example compounds with X being H and Rf being a C1 to C3 perfluoroalkylene. Particular examples include: bromo- or iodo-trifluoroethene, 4-bromo-perfluorobutene-1, 4-iodo-perfluorobutene-1, or bromo- or iodo-fluoroolefins such as 1-iodo,2,2-difluroroethene, 1-bromo-2,2-difluoroethene, 4-iodo-3,3,4,4,-tetrafluorobutene-1 and 4-bromo-3,3,4,4-tetrafluorobutene-1; 6-iodo-3,3,4,4,5,5,6,6-octafluorohexene-1.

In some embodiments, the cure sites comprise chlorine atoms. Such cure-site monomers include those of the general formula: $CX_1X_2{=}CY_1Y_2$ where $X_1$, $X_2$ are independently H and F; $Y_1$ is H, F, or Cl; and $Y_2$ is Cl, a fluoroalkyl group ($R_F$) with at least one Cl substituent, a fluoroether group ($OR_F$) with at least one Cl substituent, or $—CF_2—OR_F$. The fluoroalkyl group ($R_F$) is typically a partially or fully fluorinated $C_1$-$C_5$ alkyl group. Examples of cure-site monomer with chlorine atoms include $CF_2{=}CFCl$, $CF_2{=}CF—CF_2Cl$, $CF_2{=}CF—O—(CF_2)_n—Cl$, n=1-4; $CH_2{=}CHCl$, $CH_2{=}CCl_2$.

Typically, the amount of iodine or bromine or chlorine or their combination in the fluoropolymer is between 0.001 and 5%, preferably between 0.01 and 2.5%, or 0.1 to 1% or 0.2 to 0.6% by weight with respect to the total weight of the fluoropolymer. In one embodiment the curable fluoropolymers contain between 0.001 and 5%, preferably between 0.01 and 2.5%, or 0.1 to 1%, more preferably between 0.2 to 0.6% by weight of iodine based on the total weight of the fluoropolymer.

In other embodiments, halogenated chain transfer agents can be utilized to provide terminal cure sites. Chain transfer agents are compounds capable of reacting with the propagating polymer chain and terminating the chain propagation. Examples of chain transfer agents reported for the production of fluoroelastomers include those having the formula $RI_x$, wherein R is an x-valent fluoroalkyl or fluoroalkylene radical having from 1 to 12 carbon atoms, which, may be interrupted by one or more ether oxygens and may also contain chlorine and/or bromine atoms. R may be Rf and Rf may be an x-valent (per)fluoroalkyl or (per)fluoroalkylene radical that may be interrupted once or more than once by an ether oxygen. Examples include alpha-omega diiodo alkanes, alpha-omega diiodo fluoroalkanes, and alpha-omega diiodoperfluoroalkanes, which may contain one or more catenary ether oxygens. “Alpha-omega” denotes that the iodine atoms are at the terminal positions of the molecules. Such compounds may be represented by the general formula X—R—Y with X and Y being I and R being as described above. Specific examples include di-iodomethane, alpha-omega (or 1,4-) diiodobutane, alpha-omega (or 1,3-) diiodopropane, alpha-omega (or 1,5-) diiodopentane, alpha-omega (or 1,6-) diiodohexane and 1,2-diiodoperfluoroethane.

Other examples include fluorinated di-iodo ether compounds of the following formula:

$$R_f—CF(I)—(CX_2)_n—(CX_2CXR)_m—O—R''f\text{-}O_k—(CXR'CX_2)_p—(CX_2)_q—CF(I)—R'_f$$

wherein X is independently selected from F, H, and Cl; $R_f$ and $R'_f$ are independently selected from F and a monovalent perfluoroalkane having 1-3 carbons; R is F, or a partially fluorinated or perfluorinated alkane comprising 1-3 carbons; $R''_f$ is a divalent fluoroalkylene having 1-5 carbons or a divalent fluorinated alkylene ether having 1-8 carbons and at least one ether linkage; k is 0 or 1; and n, m, and p are independently selected from an integer from 0-5, wherein, n plus m at least 1 and p plus q are at least 1.

The fluoropolymers may or may not contain units derived from at least one modifying monomer. The modifying monomers may introduce branching sites into the polymer architecture.

Typically, the modifying monomers are bisolefins, bisolefinic ethers or polyethers. The bisolefins and bisolefinic (poly)ethers may be perfluorinated, partially fluorinated or non-fluorinated.

Preferably they are perfluorinated. Suitable perfluorinated bisolefinic ethers include those represented by the general formula:

$$CF_2{=}CF—(CF_2)_n—O—(Rf)—O—(CF_2)_m—CF{=}CF_2$$

wherein n and m are independent from each other either 1 or 0 and wherein Rf represents a perfluorinated linear or branched, cyclic or acyclic aliphatic or aromatic hydrocarbon residue that may be interrupted by one or more oxygen atoms and comprising up to 30 carbon atoms. A particular suitable perfluorinated bisolefinic ether is a di-vinylether represented by the formula:

$$CF_2{=}CF{-}O{-}(CF_2)_n{-}O{-}CF{=}CF_2$$

wherein n is an integer between 1 and 10, preferably 2 to 6, e.g. n may be 1, 2, 3, 4, 5, 6 or 7. More preferably, n represents an uneven integer, for example 1, 3, 5 or 7.

Further specific examples include bisolefinic ethers according the general formula $$CF_2{=}CF{-}(CF_2)_n{-}O{-}(CF_2)_p{-}O{-}(CF_2)_m{-}CF{=}CF_2$$

wherein n and m are independently either 1 or 0 and p is an integer from 1 to 10 or 2 to 6. For example, n may be selected to represent 1, 2, 3, 4, 5, 6 or 7, preferably, 1, 3, 5 or 7.

Further suitable perfluorinated bisolefinic ethers can be represented by the formula $$CF_2{=}CF{-}(CF_2)_p{-}O{-}(R_{af}O)_n(R_{bf}O)_m{-}(CF_2)_q{-}CF{=}CF_2$$

wherein $R_{af}$ and $R_{bf}$ are different linear or branched perfluoroalkylene groups of 1-10 carbon atoms, in particular, 2 to 6 carbon atoms, and which may or may not be interrupted by one or more oxygen atoms. $R_{af}$ and/or $R_{bf}$ may also be perfluorinated phenyl or substituted phenyl groups; n is an integer between 1 and 10 and m is an integer between 0 and 10, preferably m is 0. Further, p and q are independently 1 or 0.

In another embodiment, the perfluorinated bisolefinic ethers can be represented by the formula just described wherein m, n, and p are zero and q is 1-4.

Modifying monomers can be prepared by methods known in the art and are commercially available, for example, from Anles Ltd., St. Petersburg, Russia.

Preferably, (e.g. ethylenically unsaturated) modifying monomers are not used or only used in low amounts. Typical amounts include from 0 to 5%, or from 0 to 1.4% by weight based on the total weight of the fluoropolymer. Modifiers may be present, for example, in amounts from about 0.1% to about 1.2% or from about 0.3% to about 0.8% by weight based on the total weight of fluoropolymer. Combinations of modifiers may also be used. Further, in typical embodiments, the fluoropolymer composition comprises no greater than 8, 7, 6, 5, 4, 3, 2, 1 or 0.1 wt.-% of polymerized units with (e.g. (meth)acrylate) ester-containing moieties.

In some embodiments, the fluoropolymer contains nitrile-containing cure sites.

Although fluoropolymer with halogen cure sites (iodine, bromine, and chlorine) are favored for UV curing, in the case of thermal or e-beam curing; fluoropolymers with nitrile-containing cure cites can alternatively be employed.

When a combination of fluoropolymers with different cure sites are utilized the composition may be characterized as a dual curing, containing different cure sites that are reactive to different curing systems.

Fluoropolymers with nitrile-containing cure sites are known, such as described in U.S. Pat. No. 6,720,360.

Nitrile-containing cure sites may be reactive to other cure systems for example, but not limited to, bisphenol curing systems, peroxide curing systems, triazine curing systems, and especially amine curing systems. Examples of nitrile containing cure site monomers correspond to the following formula:

$$CF_2{=}CF{-}CF_2{-}O{-}Rf{-}CN;$$

$$CF_2{=}CFO(CF_2)_rCN;$$

$$CF_2{=}CFO[CF_2CF(CF_3)O]_p(CF_2)_vOCF(CF_3)CN;$$

$$CF_2{=}CF[OCF_2CF(CF_3)]_kO(CF_2)_uCN;$$

wherein, r represents an integer of 2 to 12; p represents an integer of 0 to 4; k represents 1 or 2; v represents an integer of 0 to 6; u represents an integer of 1 to 6, Rf is a perfluoroalkylene or a bivalent perfluoroether group. Specific examples of nitrile containing fluorinated monomers include but are not limited to perfluoro (8-cyano-5-methyl-3,6-dioxa-1-octene), $CF_2{=}CFO(CF_2)_5CN$, and $CF_2{=}CFO(CF_2)_3OCF(CF_3)CN$.

In some embodiments, the amount of nitrile-containing cure site comonomer is typically at least 0.5, 1, 1.5, 2, 3.35, 4, 4.5 or 5% by weight and typically no greater than 10% by weight; based on the total weight of the fluoropolymer.

The composition may optionally further comprise a second fluoropolymer that lacks (e.g. halogen or nitrile) cure sites. The amount of fluoropolymer lacking cure sites is typically less than 50, 45, 40, 35, 30, 25, 20, 15, 10, or 5 wt. % of the total fluoropolymer. Thus, the composition has a sufficient amount of fluoropolymer with (e.g. nitrile) cure sites such that adequate crosslinking is achieved. Further, the inclusion of cure sites, such as nitrile, can improve adhesion of the fluoropolymer composition to a (e.g. copper) substrate.

Fluorinated Curing Agent

Although various non-fluorinated curing agent are known, industry would find advantage in fluorinated curing agents due to the previously described improved properties such fluorinated curing agents can provide. The use of fluorinated curing agents can also provide processing advantages, especially for continuous processes where a fluorinated solvent is reused in a continuous process. It can be difficult to accurately monitor the curing agent concentration in a solution when the curing agent is insoluble because the curing agent can float on the surface or settle to the bottom.

The fluorinated curing agents described herein comprise one or more (per)fluorinated moities. The term (per)fluorinated means fluorinated and preferably perfluorinated. The (per)fluorinated moiety is described as Rf in the forthcoming description.

In some embodiments, the (per)fluorinated moiety is a (e.g. terminal) monovalent group.

Monovalent groups include for example (per)fluorinated alkyl groups, (per)fluorinated ether groups, and (per)fluorinated polyether groups. In some embodiments, the (per) fluorinated moiety is a divalent group. Representative Rf groups include for example n-$C_3F_7$t, i-$C_3F_7$, n-$C_4F_9$, n-$C_6F_{13}$, $CF_3OCF_2CF_2$, $C_3F_7OCF(CF_3)$, $C_3F_7OCF(CF_3)CF_2OCF(CF_3)$, $C_3F_7[OCF(CF_3)CF_2]_6OCF(CF_3)$, $C_3F_7[OCF(CF_3)CF_2]_2OCF(CF_3)$, $HCF_2CF_2CF_2CF_2$, $CF_3CHFCF_2$, $CF_3CF_2CHFCF_2$, and $(CF_3)_2NCF_2CF_2$.

Divalent groups include for example (per)fluorinated alkylene groups, (per)fluorinated ether groups, and (per) fluorinated polyether groups. The(per)fluorinated moiety typically comprises 3 or more carbon atoms. In some embodiments, the (per)fluorinated moiety comprises 3, 4, 5, or 6 (per)fluorinated carbons atoms and may also be defined by any range of such carbon atoms.

In some embodiments, the perfluorinated moiety, Rf, is HFPO—, defined as a perfluoropolyether group, $F(CF(CF_3)CF_2O)_nCF(CF_3)$— where n averages at least 2, 3, 4, 5 or 6 and typically average no greater than 12, 10, 11, 9, 8, 7, or 6. In other embodiments, Rf is a divalent—HFPO— group defined as —$(CF(CF_3)CF_2O)_nCF(CF_3)$— where n+o averages at least 2, 3, 4, 5 or 6 and typically average no greater than 12, 10, 11, 9, 8, 7, or 6. The monovalent or divalent HFPO group typically has a weight average molecular weight of at least 800, 900, 1000, 1000 or 1200 g/mole and typically no greater than 5000 g/mole. In some embodiments, HFPO— group has a weight average molecular weight of no greater than 4500, 4000, 3500, 3000, 2500, 2000, or 1500 g/mole.

In some embodiments, the fluorinated curing agent comprises at least one and in some embodiments at least two (per)fluorinated terminal groups. In other embodiments, the (per)fluorinated group of the fluorinated curing agent is present in the backbone of the fluorinated curing agent.

In some embodiments, the fluorinated curing agent comprises one or more amine groups. In some embodiments, the fluorinated curing agent comprises one or more secondary amine groups. In some embodiments, the fluorinated curing agent lacks primary amine groups.

In some embodiments, the fluorinated amine curing agent has the formula:

$$Rf—[L^1—(NR^1R^2)_n—NHR^3]_p$$

wherein:

Rf is a (per)fluorinated group;

$L^1$ is a divalent linking group or a covalent bond;

$R^1$ is independently hydrogen, an alkyl group having from 1 to 8 carbon atoms, an aminoalkyl group having from 2 to 8 carbon atoms, a hydroxyalkyl group having from 2 to 8 carbon atoms, or -$L^1$Rf;

$R^2$ independently represents an alkylene group having from 2 to 8 carbon atoms;

$R^3$ is hydrogen, an alkyl group having 1 to 4 carbon atoms, or -$L^1$Rf;

n is at least 1; and p is 1 or two.

The (per)fluorinated Rf is a (e.g. monovalent) (per)fluorinated group, as previously described.

In some embodiments, Rf is HFPO—, as previously described.

In some embodiments, $L^1$ is a divalent linking group such as alkylene (e.g. methylene, ethylene), arylene, —C(O)—, —$SO_2$— or a combination thereof. The alkylene group may further comprise sulfur or oxygen atoms including hydroxyl substituents.

In typical embodiments, at least one $R^1$ or $R^3$ group is hydrogen. In some embodiments, each $R^1$ is hydrogen. In other words the fluorinated curing agent comprises one or more primary amine groups. Primary amine groups can be preferred for curing at lower temperatures.

In typical embodiments, one or more $R^2$ groups is an alkylene group having 1 to 4 carbon atoms such as —$CH_2CH_2$—.

In some embodiments, n is at least 1 or 2. In some embodiments, n is no greater than 6, 5, 4, or 3.

Representative compounds wherein $R^3$ is —C(O)Rf include for example Rf—$CONHCH_2CH_2NHCH_2CH_2NHC(O)$—Rf, Rf—$CONH[CH_2CH_2NH]_2CH_2CH_2NHC(O)$—Rf, and $RfCONH[CH_2CH_2NH]_4C(O)Rf$.

A representative compound wherein $R^3$ is —$NR^1$ is Rf—$CO(NHCH_2CH_2)NH_2$. Other representative compounds include Rf—$CONHCH_2CH_2NHCH_2CH_2NH_2$, Rf—$SO_2NHCH_2CH_2NHCH_2CH_2NHSO_2$—Rf, Rf—$SO_2NH[CH_2CH_2NH]_2CH_2CH_2NHSO_2$—Rf, Rf—$SO_2NHCH_2CH_2NHCH_2CH_2NH_2$, Rf—$CH_2NHCH_2CH_2NHCH_2$—Rf, Rf—$CH_2NH[CH_2CH_2NH]_2CH_2CH_2NHCH_2$—Rf, Rf—$CH_2NHCH_2CH_2NHCH_2CH_2NH_2$, Rf—$CH_2CH_2NHCH_2CH_2NHCH_2CH_2NHCH_2CH_2$—Rf, Rf—$CH_2CH_2NH[CH_2CH_2NH]_2CH_2CH_2NHCH_2CH_2$—Rf, Rf—$CH_2CH_2NHCH_2CH_2NHCH_2CH_2NH_2$, Rf—$CONHCH_2CHMeNHCH_2CH_2NHC(O)$—Rf, Rf—$CONH[CH_2CHMeNH]_2CH_2CH_2NHC(O)$—Rf, Rf—$CONHCH_2CHMeNHCH_2CHMeNH_2$, Rf—$SO_2NHCH_2CHMeNHCH_2CH_2NHSO_2$—Rf, Rf—$SO_2NH[CH_2CHMeNH]_2CH_2CH_2NHSO_2$—Rf, Rf—$SO_2NHCH_2CHMeNHCH_2CH_2NH_2$, Rf—$CH_2NHCH_2CHMeNHCH_2$—Rf, Rf—$CH_2NH[CH_2CHMeNH]_2CH_2CH_2NHCH_2$—Rf, Rf—$CH_2NHCH_2CHMeNHCH_2CH_2NH_2$, Rf—$CH_2CH_2NHCH_2CHMeNHCH_2CH_2NHCH_2CH_2$—Rf, Rf—$CH_2CH_2NH[CH_2CHMeNH]_2CH_2CH_2NHCH_2CH_2$—Rf, and $RfCH_2CHMeNHCH_2CH_2NHCH_2CH_2NH_2$.

The following Table A reports various parameters of representative fluorinated curing agents that lack one or more alkoxy silane groups. Table A reports the total number average molecular weight of the fluorinated curing agent (i.e. MW), WRf—defined as the average molecular weight of the Rf group, WRh—defined as the molecular weight of the compound excluding the Rf group, WRf/WRh, fluorine (i.e. atom) content (F %), and the solubility in HFE 7300.

TABLE A

| | MW | WRf | WRh | WRf/WRh | F % | Solubility in HFE7300 |
|---|---|---|---|---|---|---|
| Perfluoroamidine of 3M DYNEON PFE 300Z | | | | <1.4 | <46 | No |
| HFPO—N3 | 2159 | 2007 | 151.6 | 13.24 | 64.96 | Yes |
| HFPO—N4 | 2430 | 2230 | 200 | 11.15 | 64.1 | Yes |
| HFPO—N6 | 2516 | 2230 | 286 | 7.80 | 61.9 | Yes |
| $C_3F_7$—$N5C_3F_7$ | 581 | 338 | 243 | 1.39 | 45.78 | No |

Notably the fluorinated curing agent having a fluorine content of greater than 46% are soluble in HFE 7300. In some embodiments, the fluorinated curing agent has a fluorine content of at least 47, 48, 49, 50, 51, 52, 53, 54, or 55%. In some embodiments, the fluorine content is no greater than 70, 69, 68, 67, 66, or 65%.

Notably the fluorinated curing agent having a WRf/WRh of greater than 1.4 are soluble in HFE 7300. In some embodiments, the WRf/WRh is at least 1.5, 1.6, 1.7 or 1.8, 1.9, or 2. In some embodiments, the WRf/WRh is at least 3, 4, 5, 6, or 7. In some embodiments, the WRf/WRh is at least 8, 9, 10, 11, 12, or 13. The WRf/WRh is typically no greater than 15 or 14.

Some other fluorinated curing agents having a fluorine content of greater than 46% and/or a WRf/WRh of greater than 1.4 that are believed to be soluble in HFE 7300 are reported as follows:

| | MW | WRf | WRh | WRf/WRh | F % |
|---|---|---|---|---|---|
| $C_4F_9CONH[CH_2CH_2NH]_4C(O)C_4F_9$ | 681 | 438 | 243 | 1.8 | 53.22 |
| $C_6F_{13}CONH[CH_2CH_2NH]_4C(O)C_6F_{13}$ | 881 | 638 | 243 | 2.62 | 56.07 |
| $C_3F_7CONH[CH_2CH_2NH]_2CH_2CH_2NH—C(O)C_3F_7$ | 538 | 338 | 200 | 1.69 | 49.44 |

Although L of the exemplied fluorinated curing agents is —C(O)— forming an amide moiety with Rf, the linking group of the fluorinated curing agents lacking one or more alkoxy silane groups is not limited to —C(O)—. In some embodiments, $L^1$ can be other divalent linking groups provided the fluorinated curing agent is soluble in a fluorinated solvent such as HFE7000. In some embodiments, $L^1$ can be other divalent linking groups provided the fluorinated curing agent has a sufficient fluorine content and WRf/WRh as previously described.

In other embodiments, the fluorinated curing agent comprises one or more (e.g. secondary) amine groups and one or more alkoxy silane groups. When the fluorinated curing agent comprises a single (e.g. secondary) amine groups and one or more alkoxy silane groups, the composition typically comprises a (e.g. silica) filler that bonds to the alkoxy silane group(s) of the fluorinated curing agent.

In another embodiment, the fluorinated amine curing agent has the formula $$Rf\text{-}(L^3\text{-}[NR^1R^2]_n—SiR^4_m(OR^5)_{3-m})_p$$

wherein

- $Rf^1$ is a (per)fluorinated group;
- $L^3$ is independently a divalent linking group or a covalent bond;
- $R^1$ is independently H, an alkyl group having from 1 to 8 carbon atoms, an aminoalkyl group having from 2 to 8 carbon atoms, a hydroxyalkyl group having from 2 to 8 carbon atoms, or $-L^1Rf$;
- $R^2$ independently represents an alkylene group having from 2 to 8 carbon atoms;
- $R^4$ is independently alkylene, arylene, or a combination thereof,
- $R^5$ is hydrogen, an alkyl group having 1 to 4 carbon atoms;
- n is at least one;
- m is 0 or 1; and
- p is 1 or 2.

In some embodiments, when p is 1, Rf is a terminal monovalent group, as previously described. When p is 2, Rf is a divalent fluorinated, as previously described. In some embodiments, Rf is a monovalent or divlanet HFPO— group, as previously described.

In some embodiments, $L^3$ is a divalent linking group such as alkylene (e.g. methylene, ethylene), arylene, —C(O)—, —$SO_2$— or a combination thereof. The alkylene group may further comprise sulfur or oxygen atoms including hydroxyl substituents.

In typical embodiments, one or more $R^1$ groups are H. In other words the fluorinated curing agent comprises one or more primary amine groups. In some embodiments, each $R^1$ group is H.

In typical embodiments, one or more $R^2$ groups is an alkylene group having 1 to 4 carbon atoms, such as —$CH_2CH_2$— or —$CH_2CH_2CH_2$—.

In some embodiments, n is at least 1 or 2. In some embodiments, n is no greater than 6, 5, or 4.

Representative compounds wherein p is 1 include for example $Rf—CONHCH_2CH_2NHCH_2CH_2CH_2—Si(OMe)_3$, $Rf—CONH[CH_2CH_2NH]_2CH_2CH_2CH_2—Si(OMe)_3$, and $Rf—CO(NHCH_2CH_2)_2NHCH_2CH_2CH_2Si(OMe)_3$.

A representative compound wherein p is 2 includes $(MeO)_3Si(CH_2)_3NHCH_2CH_2NHC(O)—Rf'—C(O)NHCH_2CH_2NH—(CH_2)_3Si(OMe)_3$.

Other representative compounds include $Rf—CONHCH_2CH_2NHCH_2CH_2CH_2—Si(OEt)_3$, $Rf—CONH[CH_2CH_2NH]_2CH_2CH_2CH_2—Si(OEt)_3$, $Rf—CONHCH_2CH_2NHCH_2CH_2CH_2Si(OEt)_3$, $Rf—SO_2NHCH_2CH_2NHCH_2CH_2CH_2—Si(OMe)_3$, $Rf—SO_2NH[CH_2CH_2NH]_2CH_2CH_2CH_2—Si(OMe)_3$, $Rf—SO_2NHCH_2CH_2NHCH_2CH_2CH_2Si(OMe)_3$, $Rf—SO_2NHCH_2CH_2NHCH_2CH_2CH_2—Si(OEt)_3$, $Rf—SO_2NH[CH_2CH_2NH]_2CH_2CH_2CH_2—Si(OEt)_3$, $Rf—SO_2NHCH_2CH_2NHCH_2CH_2CH_2Si(OEt)_3$, $Rf—CH_2NHCH_2CH_2NHCH_2CH_2CH_2—Si(OMe)_3$, $Rf—CH_2NH[CH_2CH_2NH]_2CH_2CH_2CH_2—Si(OMe)_3$, $Rf—CH_2NHCH_2CH_2NHCH_2CH_2CH_2Si(OMe)_3$, $Rf—CH_2NHCH_2CH_2NHCH_2CH_2CH_2—Si(OEt)_3$, $Rf—CH_2NH[CH_2CH_2NH]_2CH_2CH_2CH_2—Si(OEt)_3$, $Rf—CH_2NHCH_2CH_2NHCH_2CH_2CH_2Si(OEt)_3$, $Rf—CH_2CH_2NHCH_2CH_2NHCH_2CH_2CH_2—Si(OMe)_3$, $Rf—CH_2CH_2NH[CH_2CH_2NH]_2CH_2CH_2CH_2—Si(OMe)_3$, $Rf—CH_2CH_2NHCH_2CH_2NHCH_2CH_2CH_2Si(OMe)_3$, $Rf—CH_2CH_2NHCH_2CH_2NHCH_2CH_2CH_2—Si(OEt)_3$, $Rf—CH_2CH_2NH[CH_2CH_2NH]_2CH_2CH_2CH_2—Si(OEt)_3$, $Rf—CH_2CH_2NHCH_2CH_2NHCH_2CH_2CH_2Si(OEt)_3$, $RfCH_2CH(OH)CH_2NHCH_2CH_2CH_2Si(OMe)_3$, and $RfCH_2OCH_2CH(OH)CH_2NHCH_2CH_2CH_2Si(OMe)_3$.

The following Table B reports various parameters of the representative fluorinated curing agents of the examples that comprise one or more alkoxy silane groups.

TABLE B

| | MW | $W_{Rf}$ | $W_{Rh}$ | $W_{Rf}/W_{Rh}$ | F % | Solubility in HFE7300 |
|---|---|---|---|---|---|---|
| HFPO-NSi | 1364 | 1115 | 249 | 4.48 | 57.11 | Yes |
| HFPO-N2Si | 1407 | 1115 | 292 | 3.82 | 55.37 | Yes |
| HFPO(NSi)2 | 1613 | 1115 | 498 | 2.24 | 48.40 | Yes |
| $C_3F_7$—$N_2$Si | 461 | 169 | 292 | 0.5787 | 28.85 | No |
| $C_3F_7$—NSi | 418 | 169 | 249 | 0.6787 | 31.80 | Yes |

Notably the fluorinated curing agent that comprise one or more alkoxy silane groups having a fluorine content of greater than 29% are soluble in HFE 7300. In some embodiments, the fluorinated curing agent has a fluorine content of at least 30, 31 or 32%. In some embodiments, the fluorinated curing agent has a fluorine content of at least 35, 40, 45, 50, or 55%. In some embodiments, the fluorine content is no greater than 65, 64, 63, 63, 61, or 60%. Without intending to be bound by theory, fluorine content can be lower when alkoxy silane groups are present since oxygen containing groups such as alkoxy silane have improved compatibility with the ether group(s) of the fluorinated solvent.

Notably the fluorinated curing agent that comprise one or more alkoxy silane groups having a WRf/WRh of greater than 0.6 are soluble in HFE 7300. In some embodiments, the WRf/WRh is at least 0.7, 0.8, 0.9, or 1. In some embodiments, the WRf/WRh is at least 3, 4, 5, 6, or 7. In some embodiments, the WRf/WRh is at least 2, 3, or 4. The WRf/WRh is typically no greater than 10, 9, 8, 7, 6, or 5.

Another fluorinated curing agents that comprise one or more alkoxy silane groups having a fluorine content of greater than 29% and/or a WRf/WRh of greater than 0.6 that is believed to be soluble in HFE 7300 are as follows:

| | MW | $W_{Rf}$ | $W_{Rh}$ | $W_{Rf}/W_{Rh}$ | F % |
|---|---|---|---|---|---|
| $C_4F_9$—N2Si | 511 | 219 | 292 | 0.75 | 33.46 |

In some embodiments, $L^3$ can independently be other divalent linking groups provided the fluorinated curing agent is soluble in a fluorinated solvent such as HFE7000. In some embodiments, $L^3$ can independently be other divalent linking groups provided the fluorinated curing agent has a sufficient fluorine content and WRf/WRh as described below.

In some embodiments, the fluorinated curing agents may be prepared according to a method wherein at least one amine-reactive fluorinated polyether acid derivative such as, for example, esters (for example, alkyl esters having from 1 to 8 carbon atoms) and acid halides (for example, acid fluoride or acid chloride) is condensed with a primary and/or secondary amine as described in U.S. Pat. No. 7,288,619; incorporated herein my reference.

Various other fluorinated amine compounds with and without alkoxy silane groups are described in the literature.

The fluorinated curing agents described herein are not fluorinated amidines such as tetrafluoropropyl amidine, as described in 82699WO filed November 2020. Further, the fluorinated curing agents described herein are not bis(aminophenols) and bis(aminothiophenols) of the following formulas

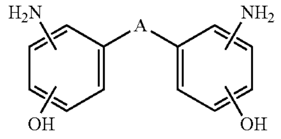

and

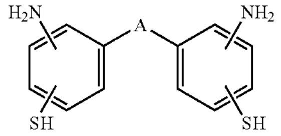

and tetraamines of the formula

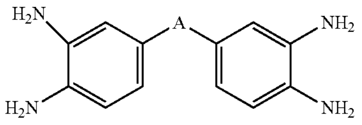

where A is $SO_2$, O, CO, alkyl of 1-6 carbon atoms, perfluoroalkyl of 1-10 carbon atoms, or a carbon-carbon bond linking the two aromatic rings. The amino and hydroxyl groups in the above formulas are interchangeably in the meta and para positions with respect to group A.

The bis(aminophenols) and bis(aminiothiophenols) compounds depicted above comprises two or more primary amines. Fluorinated amidines also have a primary amine group. In some embodiments, the fluorinated curing agent lacks primary amine groups. Solutions of fluoropolymer, fluorinated solvent, and fluorinated curing agent with primary amine can react prior to applying the coating to the substrate.

Further, as shown in the forthcoming examples 2,2-bis-(3-amino-4-hydroxyphenyl)-hexafluoropropane (CAS #83558-87-6) is not soluble in a fluorinated solvent such as HFE-7300. The lack of solubility may be due to such compound having an insufficient fluorine content or an insufficient WRf/WRh. Notably such compounds includes two aromatic rings. Further the fluorinated group (A) is a fluoroalkylene group rather than a fluoroether or fluoropolyether group. The fluorinated group (A) is divalent rather than monovalent. Further, the divalent fluorinated group (A) is bonded to an aromatic ring on both sides. Any one or any combination of such factors contributes to the insolubility in a fluorinated solvent such as HFE-7300.

In some embodiments, the fluorinated curing agent is non-aromatic, lacking one or more aromatic rings. In other embodiments, the fluorinated curing agent is aromatic, comprising a single aromatic ring. As the number of aromatic rings increases, the fluorine content decreases which can affect the solubility of the fluorinated curing agent with fluorinated solvent.

Amine curing agents can be preferred for curing fluoropolymers with nitrile cure sites.

The fluorinated curing agents are typically present in an amount of at least 0.5, 1, 1.5, or 2 wt. % based on the total weight of the fluoropolymer. The maximum amount of fluorinated curing agents is typically no greater than 10, 9, 8, 7, 6, or 5 wt. % based on the total weight of the fluoropolymer.

In some embodiments, the composition comprises one or more fluorinated curing agents that are soluble in a fluorinated solvent, such as HFE-7300, in the absence of insoluble (fluorinated and non-fluorinated) curing agents. In other embodiments, the composition may contain at least one fluorinated curing agent and at least one non-fluorinated curing agent.

Various non-fluorinated agents are known in the art some of which are described in 82699WO; incorporated herein by reference. Suitable non-fluorinated curing agents include for example, peroxides; non-fluorinated amines including for example aziridines and amino-substituted organosilanes; and non-fluorinated ethylenically unsaturated compounds.

Coating Compositions

The fluoropolymer (coating solution) compositions comprises at least one solvent. In typical embodiments, the solvent is capable of dissolving the fluoropolymer. In other embodiments, the fluoropolymer is dispersible in the solvent. The solvent is typically present in an amount of at least 25% by weight based on the total weight of the coating solution composition. In some embodiments, the solvent is present in an amount of at least 30, 35, 40, 45, 50, 55, 60, 65, 70, 75, 80, 85, 90, 95% or greater based on the total weight of the coating solution composition.

The fluoropolymer (coating solution) composition typically comprises at least 0.01, 0.02, 0.03, 0.03, 0.04, 0.04, 0.05, 0.06, 0.7, 0.8. 0.9 or 1% by weight of fluoropolymer, based on the weight of the total coating solution composition. In some embodiments, the fluoropolymer coating solution composition comprises at least 2, 3, 4, or 5% by weight of fluoropolymer. In some embodiments, the fluoropolymer coating solution composition comprises at least 6, 7, 8, 9 or 10% by weight of fluoropolymer. The fluoropolymer coating solution composition typically comprises no greater than 50, 45, 40, 35, 30, 25, or 20% by weight of fluoropolymer, based on the weight of the total coating solution composition.

In typical embodiments, the one or more of the fluoropolymer(s) of the composition are soluble in a fluorinated solvent. The one or more of the fluoropolymer(s) of the composition are soluble in a fluorinated solvent, such as HFE-7300, at a fluoropolymer concentration of at least 10 wt. % solids. In some embodiments, the one or more of the fluoropolymer(s) of the composition are soluble in a fluorinated solvent, such as HFE-7300, at a fluoropolymer concentration of at least 15, 20, 25, 30, 35, 40, 45, or 50 wt. % solids. In other embodiments, the fluoropolymer is dispersible in the fluorinated solvent at such concentrations, yet is not soluble in the fluorinated solvent.

Optimum amounts of solvent and fluoropolymers may depend on the final application and may vary. For example, to provide thin coatings, very dilute solutions of fluoropolymer in the solvent may be desired, for example amounts of from 0.01% by weight to 5% by weight of fluoropolymer. Also for application by spray coating composition of low viscosity may be preferred over solutions with high viscosity. The concentration of fluoropolymer in the solution affects the viscosity and may be adjusted accordingly. An advantage of the present disclosure is that also solutions with high concentrations of fluoropolymer can be prepared that still provide clear liquid composition of low viscosity.

In some embodiments, the fluoropolymer coating solution compositions may be liquids. The liquids may have, for example, a viscosity of less than 2,000 mPas at room temperature (20° C.+/−2° C.). In other embodiments, the fluoropolymer coating solution compositions are pastes. The pastes may have, for example, a viscosity of from 2,000 to 100.000 mPas at room temperature (20° C.+/−2° C.).

The solvent is a liquid at ambient conditions and typically has a boiling point of greater than 50° C. Preferably, the solvent has a boiling point below 200° C. so that it can be easily removed. In some embodiments, the solvent has a boiling point below 190, 180, 170, 160, 150, 140, 130, 120, 110, or 100° C.

The solvent is partially fluorinated or perfluorinated. Thus, the solvent is non-aqueous. Various partially fluorinated or perfluorinated solvents are known including perfluorocarbons (PFCs), hydrochlorofluorocarbons (HCFCs), perfluoropolyethers (PFPEs), and hydrofluorocarbons (HFCs), as well as fluorinated ketones and fluorinated alkyl amines.

In some embodiments, the solvent has a global warming potential (GWP, 100 year ITH) of less than 1000, 900, 800, 700, 600, 500, 400, 300, 200 or 100. The GWP is typically greater than 0 and may be at least 10, 20, 30, 40, 50, 60, 70, or 80.

As used herein, GWP is a relative measure of the global warming potential of a compound based on the structure of the compound. The GWP of a compound, as defined by the Intergovernmental Panel on Climate Change (IPCC) in 1990 and updated in subsequent reports, is calculated as the warming due to the release of 1 kilogram of a compound relative to the warming due to the release of 1 kilogram of $CO_2$ over a specified integration time horizon (ITH).

$$GWP_x = \frac{\int_0^{ITH} F_x C_{x_o} \exp(-t/\tau_x) dt}{\int_0^{ITH} F_{CO_2} C_{CO_2}(t)\, dt}$$

where F is the radiative forcing per unit mass of a compound (the change in the flux of radiation through the atmosphere due to the IR absorbance of that compound), $C_0$ is the atmospheric concentration of a compound at initial time, τ is the atmospheric lifetime of a compound, t is time, and x is the compound of interest.

In some embodiments, the solvent comprises a partially fluorinated ether or a partially fluorinated polyether. The partially fluorinated ether or polyether may be linear, cyclic or branched. Preferably, it is branched. Preferably it comprises a non-fluorinated alkyl group and a perfluorinated alkyl group and more preferably, the perfluorinated alkyl group is branched.

In one embodiment, the partially fluorinated ether or polyether solvent corresponds to the formula:

Rf—O—R wherein Rf is a perfluorinated or partially fluorinated alkyl or (poly)ether group and R is a non-fluorinated or partially fluorinated alkyl group. Typically, Rf may have from 1 to 12 carbon atoms. Rf may be a primary, secondary or tertiary fluorinated or perfluorinated alkyl residue. This means, when Rf is a primary alkyl residue the carbon atom linked to the ether atoms contains two fluorine atoms and is bonded to another carbon atom of the fluorinated or perfluorinated alkyl chain. In such case Rf would correspond to $R_f^1$—$CF_2$— and the polyether can be described by the general formula: $R_f^1$—$CF_2$—O—R.

When Rf is a secondary alkyl residue, the carbon atom linked to the ether atom is also linked to one fluorine atoms and to two carbon atoms of partially and/or perfluorinated alkyl chains and Rf corresponds to $(R_f^2R_f^3)CF$—. The polyether would correspond to $(R_f^2R_f^3)CF$—O—R.

When Rf is a tertiary alkyl residue the carbon atom linked to the ether atom is also linked to three carbon atoms of three partially and/or perfluorinated alkyl chains and Rf corresponds to $(R_f^4R_f^5R_f^6)$—C—. The polyether then corresponds to $(R_f^4R_f^5R_f^6)$—C—OR. $R_f^1$; $R_f^2$; $R_f^3$; $R_f^4$; $R_f^5$; $R_f^6$ correspond to the definition of Rf and are a perfluorinated or partially fluorinated alkyl group that may be interrupted once or more than once by an ether oxygen. They may be linear or branched or cyclic. Also a combination of polyethers may be used and also a combination of primary, secondary and/or tertiary alkyl residues may be used.

An example of a solvent comprising a partially fluorinated alkyl group includes $C_3F_7OCHFCF_3$ (CAS No. 3330-15-2).

An example of a solvent wherein Rf comprises a perfluorinated (poly)ether is $C_3F_7OCF(CF_3)CF_2OCHFCF_3$ (CAS No. 3330-14-1).

In some embodiments, the partially fluorinated ether solvent corresponds to the formula:

CpF2p+1—O—CqH2q+1 wherein q is an integer from 1 to and 5, for example 1, 2, 3, 4 or 5, and p is an integer from 5 to 11, for example 5, 6, 7, 8, 9, 10 or 11. Preferably, $C_pF_{2p+1}$ is branched. Preferably, $C_pF_{2p+1}$ is branched and q is 1, 2 or 3.

Representative solvents include for example 1,1,1,2,2,3,4,5,5,5-decafluoro-3-methoxy-4-(trifluoromethyl)pentane and 3-ethoxy-1,1,1,2,3,4,4,5,5,6,6,6-dodecafluroro-2-(trifluoromethyl)hexane. Such solvents are commercially available, for example, under the trade designation NOVEC from 3M Company, St. Paul, MN.

The fluorinated (e.g. ethers and polyethers) solvents may be used alone or in combination with other solvents, which may be fluorochemical solvents or non-fluorochemical solvents. When a non-fluorochemical solvent is combined with a fluorinated solvent, the concentration non-fluorochemical solvent is typically less than 30, 25, 20, 15, 10 or 5 wt-% with respect to the total amount of solvent. Representative non-fluorochemical solvents include ketones such as acetone, MEK, methyl isobutyl ketone, methyl amyl ketone and NMP; ethers such as tetrahydrofuran, 2-methyl tetrahydrofuran and methyl tetrahydrofurfuryl ether; esters such as methyl acetate, ethyl acetate and butyl acetate; cyclic esters such as delta-valerolactone and gamma-valerolactone.

The coating composition described herein including fluorinated solvent is "stable, meaning that the coating composition remains homogeneous when stored for at least 24 hours at room temperature in a sealed container. In some embodiments, the coating composition is stable for one week or more. "Homogeneous" refers to a coating composition that does not exhibit a visibly separate precipitate or visibly separate layer when freshly shaken, placed in a 100 ml glass container and allowed to stand at room temperature for at least 4 hours.

Crystalline Fluoropolymer

In some embodiments, the composition further comprises crystalline fluoropolymer. The crystalline fluoropolymer may be present as particles. Alternatively, the crystalline fluoropolymer may be present as a second phase that may be formed by sintering the crystalline fluoropolymer particles at a temperature at or above the melting temperature of the crystalline fluoropolymer particles or melting and extruding the fluoropolymer composition.

In some embodiments, the fluoropolymer particles may be characterized as an "agglomerate" (e.g. of latex particles), meaning a weak association between primary particles such as particles held together by charge or polarity. Agglomerates are typically physically broken down into smaller entities such as primary particles during preparation of the coating solution. In other embodiments, the fluoropolymer particles may be characterized as an "aggregate", meaning strongly bonded or fused particles, such as covalently bonded particles or thermally bonded particles prepared by processes such as sintering, electric arc, flame hydrolysis, or plasma. Aggregates are typically not broken down into smaller entities such as primary particles during preparation of the coating solution. "Primary particle size" refers to the mean diameter of a single (non-aggregate, non-agglomerate) particle.

In one embodiment, such coating composition is prepared by blending a latex containing (e.g. crystalline) fluoropolymer particles with a latex containing amorphous fluoropolymer particles.

The latexes can be combined by any suitable manner such as by vortex mixing for 1-2 minutes. The method further comprises coagulating the mixture of latex particles. Coagulation may be carried out, for example, by chilling (e.g., freezing) the blended latexes or by adding a suitable salt (e.g., magnesium chloride). Chilling is especially desirable for coatings that will be used in semiconductor manufacturing and other applications where the introduction of salts may be undesirable. The method further comprising optionally washing the coagulated mixture of amorphous fluoropolymer particles and crystalline fluoropolymer particles. The washing step may substantially remove emulsifiers or other surfactants from the mixture and can assist in obtaining a well-mixed blend of substantially unagglomerated dry particles. In some embodiments, the surfactant level of the resulting dry particle mixture may, for example, be less than 0.10% by weight, less than 0.05% by weight or less than 0.01% by weight. The method further comprises drying the coagulated latex mixture. The coagulated latex mixture can be dried by any suitable means such as air drying or oven drying. In one embodiment, the coagulated latex mixture can be dried at 100° C. for 1-2 hours.

In some embodiments, the dried coagulated latex mixture can be dissolved in a solvent suitable for dissolving the amorphous fluoropolymer particles to form a stable coating composition containing a homogeneous dispersion of the crystalline fluoropolymer particles in a solution of the amorphous fluoropolymer. In other embodiments, the dried coagulated latex mixture can be thermally processed.

The coating solution can be utilized to provide a coating on a substrate by applying a layer of the coating composition to a surface of a substrates and drying (i.e. removing the fluorinated solvent by evaporation) the coating composition. In some embodiments, the method further comprises heating the coated substrate to a temperature above the melt temperature of the fluoropolymer particles to sinter the fluoropolymer particles.

In some embodiments, the method further comprises rubbing (e.g. buffing, polishing) the dried layer thereby forming an amorphous fluoropolymer binder layer containing (e.g. crystalline) micron and optionally submicron fluoropolymer particles. A variety of rubbing techniques can be employed at the time of coating formation or later when the coated article is used or about to be used. Simply wiping or buffing the coating a few times using a cheesecloth or other suitable woven, nonwoven or knit fabric will often suffice to form the desired thin layer. Those skilled in the art will appreciate that many other rubbing techniques may be employed. Rubbing can also reduce haze in the cured coating.

The crystalline fluoropolymer particles at the coating surface forms a thin, continuous or nearly continuous fluoropolymer surface layer disposed on the underlying coating comprised of the amorphous fluoropolymer. In preferred embodiments the thin crystalline fluoropolymer layer is relatively uniformly smeared over the underlying coating and appears to be thinner and more uniform than might be the case if the fluoropolymer particles had merely undergone fibrillation (e.g., due to orientation or other stretching).

Average roughness (Ra) of the surface is the arithmetic average of the absolute values of the surface height deviation measured from the mean plane. The fluoropolymer layer or fluoropolymer film has a low average roughness. In some embodiments, Ra is at least 40 or 50 nm, ranging up to 100 nm before rubbing. In some embodiments, the surface after rubbing is at least 10, 20, 30, 40, 50 or 60% smoother. In some embodiments, Ra is less than 35, 30, 25, or 20 nm after rubbing.

When a thin coating is prepared from micron sized fluoropolymer particles the average roughness can be greater. In some embodiments, the average roughness is micron sized. However, when the thickness of the coating or fluoropolymer film is greater than the particle size of the (e.g. crystalline) fluoropolymer particles, the surface of the fluoropolymer coating or film can have a low average roughness as previously described.

An advantage of the coating compositions described herein is that the coating compositions can be used to prepare coatings of high or low thickness. In some embodiments, the dried and cured coating has a thickness of 0.1 microns to 10 mils. In some embodiments, the dried and cured coating thickness is at least 0.2, 0.3, 0.4, 0.5, or 0.6 microns. In some embodiments, the dried and cured coating thickness is at least 1, 2, 3, 4, 5, 6, 7, 8, 9, or 10 microns ranging up to 100, 150, or 200 microns.

A variety of crystalline fluoropolymer particles may be employed including mixtures of different crystalline fluoropolymer particles. The crystalline fluoropolymer particles typically have high crystallinity and therefore a significant melting point (peak maximum) as determined by differential scanning calorimetry in accordance with DIN EN ISO 11357-3:2013-04 under nitrogen flow and a heating rate of 10° C./min. Thus, the fluoropolymer particles are typically thermoplastic.

For example, the crystalline fluoropolymer (e.g. particles) may include particles of fluoropolymers having a Tm of at least 100, 110, 120, or 130° C. In some embodiments, the crystalline fluoropolymer (e.g. particles) may include particles of fluoropolymers having a Tm no greater than 350, 340, 330, 320, 310 or 300° C.

The crystalline fluoropolymer (e.g. particles) typically have a fluorine content greater than about 50 weight percent. Also, the fluoropolymer (e.g. particles) may include fluoropolymers having a fluorine content between about 50 and about 76 weight percent, between about 60 and about 76 weight percent, or between about 65 and about 76 weight percent.

Representative crystalline fluoropolymers include, for example, perfluorinated fluoropolymers such as 3M™ Dyneon™ PTFE Dispersions TF 5032Z, TF 5033Z, TF 5035Z, TF 5050Z, TF 5135GZ, and TF 5070GZ; and 3M™ Dyneon™ Fluorothermoplastic Dispersions PFA 6900GZ, PFA 6910GZ, FEP 6300GZ, THV 221, THV 340Z, and THV 800. Other suitable fluoropolymer particles are available from suppliers such as Asahi Glass, Solvay Solexis, and Daikin Industries and will be familiar to those skilled in the art.

Commercial aqueous dispersion usually contain non-ionic and/or ionic surfactants at concentration up to 5 to 10 wt. %. These surfactants are substantially removed by washing the coagulated blends. A residual surfactant concentration of less than 1, 0.05, or 0.01 wt. % may be present. Quite often it is more convenient to use the "as polymerized" aqueous fluoropolymer-latexes as they do not contain such higher contents of non-ionic/ionic surfactants.

As previously described, the crystalline fluoropolymers have a melt point that can be determined by DSC. Crystallinity depends on the selection and concentration of polymerized monomers of the fluoropolymer. For example, PTFE homopolymers (containing 100% TFE-units) have a melting point (Tm) above 340° C. The addition of comonomers, such as the unsaturated (per)fluorinated alkyl ethers, reduces the Tm. For example, when the fluoropolymer contains about 3-5 wt. % of polymerized units of such comonomer, the Tm is about 310° C. As yet another example, when the fluoropolymer contains about 15-20 wt. % of polymerized units of HFP, the Tm is about 260-270° C. As yet another example, when the fluoropolymer contains 30 wt. % of polymerized units of (per)fluorinated alkyl ethers (e.g. PMVE) or other comonomer(s) that reduce the crystallinity the fluoropolymer no longer has a detectable melting point via DSC, and thus is characterized as being amorphous.

In some embodiments, the crystalline fluoropolymer (e.g. particles) contain at least 40, 45, 50, 55, 60, 65, 70, 75, 80, 85, 90, 95 or about 100 wt. % of polymerized units of TFE. The crystalline fluoropolymer (e.g. particles) typically have a greater amount of polymerized units of TFE than the crosslinked fluoropolymer. More typically the crystalline fluoropolymer particles contain at least 85, 90, 95 or about 100 wt. % of polymerized units of TFE. Further, the crystalline fluoropolymer (e.g. particles) typically comprise a lower concentration of unsaturated (per)fluorinated alkyl ethers (e.g. PMVE) than the amorphous flurorpolymer. In typical embodiments, the crystalline fluoropolymer (e.g. particles) contains less than 30, 25, 20, 15, 14, 13, 12, 11, 10, 9, 8, 7, 6, or 5 wt. % of polymerized units of (per)fluorinated alkyl ethers (e.g. PMVE).

In some embodiments, the crystalline fluoropolymers are copolymers formed from the constituent monomers known as tetrafluoroethylene ("TFE"), hexafluoropropylene ("HFP"), and vinylidene fluoride ("VDF," "VF2,"). The monomer structures for these constituents are shown below:

$$TFE\text{: } CF_2{=}CF_2 \quad (1)$$

$$VDF\text{: } CH_2{=}CF_2 \quad (2)$$

$$HFP\text{: } CF_2{=}CF{-}CF_3 \quad (3)$$

In some embodiments, the crystalline fluoropolymer consists of at least two of the constituent monomers (HFP and VDF), and in some embodiments all three of the constituents monomers in varying amounts.

The Tm depends on the amounts of TFE, HFP, and VDF. For example, a fluoropolymer comprising about 45 wt. % of polymerized units of TFE, about 18 wt. % of polymerized units of HFP, and about 37 wt. % of polymerized units of VDF has a Tm of about 120° C. As yet another example, a fluoropolymer comprising about 76 wt. % of polymerized units of TFE, about 11 wt. % of polymerized units of HFP, and about 13 wt. % of polymerized units of VDF has a Tm of about 240° C. By Increasing the polymerized units of HFP/VDF, while reducing the polymerized units of TFE, the fluoropolymer becomes amorphous. An overview of crystalline and amorphous Fluoropolymers is described by Ullmann's Encyclopedia of Industrial Chemistry ($7^{th}$ Edition, 2013 Wiley-VCH Verlag. 10. 1002/14356007.a11 393 pub 2) Chapter: Fluoropolymers, Organic.

In some embodiments, the crystalline fluoropolymers comprise little or no polymerized units of VDF. The amount of polymerized units of VDF is no greater than 5, 4, 3, 2, or 1 wt. % of the total crystalline fluoropolymer.

In some embodiments, the crystalline fluoropolymers comprises polymerized units of HFP. The amount of polymerized units of HFP can be at least 1, 2, 3, 4, 5 wt. % of the total crystalline fluoropolymer. In some embodiments, the amount of polymerized units of HFP is no greater than 15, 14, 13, 12, 11, or 10 wt. % of the total crystalline fluoropolymer.

In some embodiments, the fluoropolymers of the compositions described here comprise little or no polymerized units of vinylidene fluoride (VDF) (i.e. $CH_2{=}CF_2$) or VDF coupled to hexafluoropropylene (HFP). Polymerized units of VDF can undergo dehydrofluorination (i.e. an HF elimination reaction) as described in US2006/0147723. The reaction is limited by the number of polymerized VDF groups coupled to an HFP group contained in the fluoropolymer.

The crystalline fluoropolymer (e.g. particles) and amorphous fluoropolymer (e.g. particles) may be combined in a variety of ratios. For example, the coating composition contains about 5 to about 95 weight percent crystalline fluoropolymer (e.g. particles) and about 95 to about 5 weight percent amorphous fluoropolymer, based on the total weight percent of solids (i.e. excluding the solvent). In some embodiments, the coating composition contains about 10 to about 75 weight percent crystalline fluoropolymer (e.g. particles) and about 90 to about 25 weight amorphous fluoropolymer.

In some embodiments, the coating composition or fluoropolymer film contains at least 5, 10, or 15 weight percent ranging up to about 50, 55, 60, 65, 70, 75, or 80 weight percent crystalline fluoropolymer (e.g. particles) and about 20, 30, 40, or 50 to about 90 weight percent amorphous fluoropolymer. In some embodiments, the coating composition contains about 10 to about 30 weight percent crystalline fluoropolymer particles and about 90 to about 70 weight percent amorphous fluoropolymer.

In some embodiments, fluoropolymer composition comprises fluoropolymer particles have a particle size of greater than 1 micron. In typical embodiments, the fluoropolymer particles have an average particle size of no greater than 75, 70, 65, 60, 55, 50, 45, 35, 30, 30, 25, 20, 15, 10, or 5 microns. In some embodiments, the particle size of the fluoropolymer particles is less than the thickness of the fluoropolymer coating or fluoropolymer film layer. The average particle size is typically reported by the supplier. The particle size of the fluoropolymer particles of the fluoropolymer coating or fluoropolymer film layer can be determined by microscopy.

In some embodiments, the fluoropolymer particles comprise a mixture of particles including fluoropolymer particles having a particle size of greater than 1 micron and fluoropolymer particles having a particle size of 1 micron or less. In some embodiments, the submicron fluoropolymer particle size range may be about 50 to about 1000 nm, or about 50 to about 400 nm, or about 50 to about 200 nm.

The weight ratio of fluoropolymer particles having a particle size greater than 1 micron to fluoropolymer particles having a particle size of 1 micron or less typically ranges from 1:1 to 10:1. In some embodiments, the weight ratio of larger to smaller fluoropolymer particles is at least 2:1, 3:1, 4:1, 5:1, 6:1, 7:1, 8:1 or 9:1.

The crystalline fluoropolymer (e.g. particles) are insoluble in fluorinated solvent. The crystalline fluoropolymer (e.g. particles) are also insoluble in non-fluorinated organic solvent such as methyl ethyl ketone ("MEK"), tetrahydrofuran ("THF"), ethyl acetate or N-methyl pyrrolidinone ("NMP").

Additives

Compositions containing curable fluoroelastomers may further contain additives as known in the art. Examples include acid acceptors. Such acid acceptors can be inorganic or blends of inorganic and organic acid acceptors. Examples of inorganic acceptors include magnesium oxide, lead oxide, calcium oxide, calcium hydroxide, dibasic lead phosphate, zinc oxide, barium carbonate, strontium hydroxide, calcium carbonate, hydrotalcite, etc. Organic acceptors include epoxies, sodium stearate, and magnesium oxalate. Particularly suitable acid acceptors include magnesium oxide and zinc oxide. Blends of acid acceptors may be used as well. The amount of acid acceptor will generally depend on the nature of the acid acceptor used. Typically, the amount of acid acceptor used is between 0.5 and 5 parts per 100 parts of fluorinated polymer.

The fluoropolymer composition may contain further additives, such as stabilizers, surfactants, ultraviolet ("UV") absorbers, antioxidants, plasticizers, lubricants, fillers, and processing aids typically utilized in fluoropolymer processing or compounding, provided they have adequate stability for the intended service conditions. A particular example of additives includes carbon particles, like carbon black, graphite, soot. Further additives include but are not limited to pigments, for example iron oxides, titanium dioxides. Other additives include but are not limited to clay, silicon dioxide, barium sulphate, silica, glass fibers, or other additives known and used in the art.

In some embodiments, the fluoropolymer composition comprises silica, glass fibers, thermally conductive particles, or a combination thereof. Any amount of silica and/or glass fibers and/or thermally conductive particles may be present. In some embodiments, the amount of silica and/or glass fibers is at least 0.05, 0.1, 0.2, 0.3 wt. % of the total solids of the composition. In some embodiments, the amount of silica and/or glass fibers is no greater than 5, 4, 3, 2, or 1 wt. % of the total solids of the composition. Small concentrations of silica can be utilized to thicken the coating composition. Further, small concentrations of glass fibers can be used to improve the strength of the fluoropolymer film. In other embodiments, the amount of glass fibers can be at least 5, 10, 15, 20, 25, 35, 40, 45 or 50 wt-% of the total solids of the composition. The amount of glass fibers is typically no greater than 55, 50, 45, 40, 35, 25, 20, 15, or 10 wt. %. In some embodiments, the glass fibers have a mean length of at least 100, 150, 200, 250, 300, 350, 400, 450, 500 microns. In some embodiments, the glass fibers have a mean length of at least 1, 2, or 3 mm and typically no greater than 5 or 10 mm. In some embodiments, the glass fibers have a mean diameter of at least 1, 2, 3, 4, or 5 microns and typically no greater than 10, 15, 30, or 25 microns. The glass fibers can have aspect ratio of at least 3:1, 5:1, 10:1, or 15:1.

In some embodiments, the fluoropolymer composition is free of (e.g. silica) inorganic oxide particles. In other embodiments, the fluoropolymer composition comprises (e.g. silica and/or thermally conductive) inorganic oxide particles. In some embodiments, the amount of (e.g. silica and/or thermally conductive) inorganic oxide particles is at least 5, 10, 15, 20, 25, 30, 35, 40, 45 or 50 wt. % of the total solids of the composition. In some embodiments, the amount of (e.g. silica and/or thermally conductive) inorganic oxide particles is no greater than 90, 85, 80, 75, 70, or 65 wt. % of the total solids of the composition. Various combinations of silica and thermally conductive particles can be utilized. In some embodiments, the total amount of (e.g. silica and thermally conductive) inorganic oxide particles or the amount of a specific type of silica particle (e.g. fused silica, fumed silica, glass bubbles, etc.) or thermally conductive particle (e.g. boron nitride, silicon carbide, aluminum oxide, aluminum trihydrate) is no greater than 60, 55, 50, 45, 40, 35, 30, 25, 20, 15, 10, or 5 wt. % of the total solids of the composition. Higher concentrations of (e.g. silica) inorganic oxide particles can be favorable to further reducing the dielectric properties. Thus, the compositions including (e.g. silica) inorganic oxide particles can have even lower dielectric properties than the crosslinked fluoropolymer alone.

In some embodiments, the (e.g. silica) inorganic oxide particles and/or glass fibers have a dielectric constant at 1 GHz of no greater than 7, 6.5, 6, 5.5, 5, 4.5, or 4. In some embodiments, the (e.g. silica) inorganic oxide particles and/or glass fibers have a dissipation factor at 1 GHz of no greater than 0.005, 004, 0.003, 0.002, or 0.0015.

In some embodiments, the composition comprises inorganic oxide particles or glass fibers that comprise predominantly silica. In some embodiments, the amount of silica is typically at least 50, 60, 70, 75, 80, 85, or 90 wt. % of the inorganic oxide particles or glass fibers, In some embodiments, the amount of silica is typically at least 90, 91, 92, 93, 94, 95, 96, 97, 98, 99, or greater (e.g. at least 99.5, 99.6, or 99.7) wt-% silica. Higher silica concentrations typically have lower dielectric constants. In some embodiments, (e.g. fused) silica particle can further comprise small concentration of other metals/meta oxides such as $Al_2O_3$, $Fe_2O_5$, $TiO_2$, $K_2O$, CaO, MgO and $Na_2O$. In some embodiments, the total amount of such metals/metal oxides (e.g. $Al_2O_3$, CaO and MgO) is independently no greater than 30, 25, 20, 15, or 10 wt. %. In some embodiments, the inorganic oxide particles or glass fibers may comprise $B_2O_3$ The amount of $B_2O_3$ can range up to 25 wt. % of the inorganic oxide particles or glass fibers. In other embodiments, (e.g. fumed) silica particle can further comprise small concentration of additional metals/metal oxides such as Cr, Cu, Li, Mg, Ni, P and Zr. In some embodiments, the total amount of such metals or metal oxides is no greater 5, 4, 3, 2, or 1 wt. %. In some embodiments, the silica may be described as quartz. The amount of non-silica metals or metal oxides can be determined by uses of inductively coupled plasma mass spectrometry. The (e.g. silica) inorganic oxides particles are typically dissolved in hydrofluoric acid and distilled as $H_2SiF_6$ at low temperatures.

In some embodiments, the inorganic particles may be characterized as an "agglomerate", meaning a weak association between primary particles such as particles held together by charge or polarity. Agglomerate are typically physically broken down into smaller entities such as primary particles during preparation of the coating solution. In other embodiments, the inorganic particles may be characterized as an "aggregate", meaning strongly bonded or fused particles, such as covalently bonded particles or thermally bonded particles prepared by processes such as sintering, electric arc, flame hydrolysis, or plasma. Aggregates are typically no broken down into smaller entities such as primary particles during preparation of the coating solution. "Primary particle size" refers to the mean diameter of a single (non-aggregate, non-agglomerate) particle.

The (e.g. silica) particles may have various shapes such as spherical, ellipsoid, linear or branched. Fused and fumed silica aggregates are more commonly branched. The aggregate size is commonly at least 10× the primary particle size of discrete part.

In other embodiments, the (e.g. silica) particles may be characterized as glass bubbles. The glass bubble may be prepared from soda lime borosilicate glass. In this embodiment, the glass may contain about 70 percent silica (silicon dioxide), 15 percent soda (sodium oxide), and 9 percent lime (calcium oxide), with much smaller amounts of various other compounds.

In some embodiments, the inorganic oxide particles may be characterized as (e.g. silica) nanoparticles, having a mean or median particles size less than 1 micron. In some embodiments, the mean or median particle size of the (e.g. silica) inorganic oxide particles is at 500 or 750 nm. In other embodiments, the mean particle size of the (e.g. silica) inorganic oxide particles may be at least 1, 1.5, 2, 2.5, 3, 3.5, 4, 4.5, 5, 5.5, 6, 6.5, 7, 7.5, 8, 8.5, 9, 9.5 or 10 microns. In some embodiments, the mean particle size in no greater than 30, 25, 20, 15, or 10 microns. In some embodiments, the composition comprises little or no (e.g. colloidal silica) nanoparticles having a particle of 100 nanometers or less. The concentration of (e.g. colloidal silica) nanoparticles is typically less than (10, 9, 8, 7, 6, 5, 4, 3, 2, or 1 wt. %) The inorganic oxide (e.g. silica particle) may comprise a normal distribution of particle sizes having a single peak or a distribution of particles having two or more peaks.

In some embodiments, no greater than 1 wt. % of the (e.g. silica) inorganic oxide particles have a particle size greater than or equal to 3 or 4 microns. In some embodiments, no greater than 1 wt. % of the (e.g. silica) inorganic oxide particles have a particle size greater than or equal to 5 or 10 microns. In other embodiments, no greater than 5, 4, 3, 2, or 1 wt. % of the particles have a particle size greater than 45 microns. In some embodiments, no greater than 1 wt. % of the particles have a particle size ranging from 75 to 150 microns.

In some embodiments, the mean or median particle size refers to the "primary particle size" referring to the mean or median diameter of discrete a non-aggregated, non-agglomerated particles. For example, the particle size of colloidal silica or glass bubbles is typically the mean or median particle size of In preferred embodiments, the mean or median particle size refers to the mean or median diameter of the aggregates. The particle size of the inorganic particles can be measured using transmission electron microscopy. The particle size of the fluoropolymer coating solution can be measured using dynamic light scattering.

In some embodiments, the (e.g. silica) inorganic particles have a specific gravity ranging from 2.18 to 2.20 g/cc.

Aggregated particles, such as in the case of fumed and fused (e.g. silica) particles, can have a lower surface area than primary particles of the same size. In some embodiments, the (e.g. silica) particle have a BET surface area ranging from about 50 to 500 $m^2/g$. In some embodiments, the BET surface area is less than 450, 400, 350, 300, 250, 200, 150, or 100 $m^2/g$.

In some embodiments, the inorganic nanoparticles may be characterized as colloidal silica. It is appreciated that unmodified colloidal silica nanoparticles commonly comprise hydroxyl or silanol functional groups on the nanoparticle surface and are typically characterized as hydrophilic.

In some embodiments, (e.g. silica aggregate) inorganic particles and especially colloidal silica nanoparticles are surface treated with a hydrophobic surface treatment. Common hydrophobic surface treatments include compounds such as alkoxylsilanes (e.g. octadecytriethoxysilane), silazane, or siloxanes. Various hydrophobic fumed silicas are commercially available from AEROSIL™, Evonik, and various other suppliers. Representative hydrophobic fumed silica include AEROSIL™ grades R 972, R 805, RX 300, and NX 90 S.

In some embodiments, (e.g. silica aggregate) inorganic particles are surface treated with a fluorinated alkoxysilane silane compound. Such compounds typically comprise a perfluoroalkyl or perfluoropolyether group. The perfluoroalkyl or perfluoropolyether group typically has no greater than 4, 5, 6, 7, 8 carbon atoms. The alkoxysilane group can be bonded to the alkoxy silane group with various divalent linking groups including alkylene, urethane, and $—SO_2N(Me)$-. Some representative fluorinated alkoxy silanes are described in U.S. Pat. No. 5,274,159 and WO2011/043973; incorporated herein by reference. Other fluorinated alkoxy silanes are commercially available.

In some embodiments, the fluoropolymer composition comprises thermally conductive particles. In some embodiments, the thermally conductive inorganic particles are preferably an electrically non-conductive material. Suitable electrically non-conductive, thermally conductive materials include ceramics such as metal oxides, hydroxides, oxyhydroxides, silicates, borides, carbides, and nitrides. Suitable ceramic fillers include, e.g., silicon oxide, zinc oxide, alumina trihydrate (ATH) (also known as hydrated alumina, aluminum oxide, and aluminum trihydroxide), aluminum nitride, boron nitride, silicon carbide, and beryllium oxide. Other thermally conducting fillers include carbon-based materials such as graphite and metals such as aluminum and copper. Combinations of different thermally conductive materials may be utilized. Such materials are not electrically conductive, i.e. have an electronic band gap greater than 0 eV and in some embodiments, at least 1, 2, 3, 4, or 5 eV. In some embodiments, such materials have an electronic band gap no greater than 15 or 20 eV. In this embodiment, the composition may optionally further comprise a small concentration of thermally conductive particles having an electronic band gap of less than 0 eV or greater than 20 eV.

In favored embodiments, the thermally conductive particles comprise a material having a bulk thermal conductivity >10 W/m*K. The thermal conductivity of some representative inorganic materials is set forth in the following table.

Thermally Conductive Materials

| Material | Thermal Conductivity (W/m*K) | Electronic Band Gap (eV) | Density |
|---|---|---|---|
| α-Aluminum Oxide[1] | 30 | 5-9 | 3.95 g/cc |
| Alumina Trihydrate[2] | 21 | | 2.42-2.45 g/cc |
| Silicon Carbide (SiC)[1] | 120 | 2.4 | 3.21 g/cc |
| Hexagonal Boron Nitride (BN)[1] | 185-300 | 2.1 | 2.1 g/cc |

In some embodiments, the thermally conductive particles comprise material(s) having a bulk thermal conductivity of at least 15 or 20 W/m*K. In other embodiments, the thermally conductive particles comprise material(s) having a bulk thermal conductivity of at least 25 or 30 W/m*K. In yet other embodiments, the thermally conductive particles comprise material(s) having a bulk thermal conductivity of at least 50, 75 or 100 W/m*K. In yet other embodiments, the thermally conductive particles comprise material(s) having a bulk thermal conductivity of at least 150 W/m*K. In typical embodiments, the thermally conductive particles comprise material(s) having a bulk thermal conductivity of no greater than about 350 or 300 W/m*K.

Thermally conductive particles are available in numerous shapes, e.g. spheres and acicular shapes that may be irregular or plate-like. In some embodiments, the thermally conductive particles are crystals, typically have a geometric shape. For example, boron nitride hexagonal crystals are commercially available from Momentive. Further, alumina trihydrate is described as a hexagonal platelet. Combinations of particles with different shapes may be utilized. The thermally conductive particles generally have an aspect ratio less than 100:1, 75:1, or 50:1. In some embodiment, the thermally conductive particles have an aspect ratio less than 3:1, 2.5:1, 2:1, or 1.5:1. In some embodiments, generally symmetrical (e.g., spherical, semi-spherical) particles may be employed.

Boron nitride particles are commercially available from 3M as "3M™ Boron Nitride Cooling Fillers".

In some embodiments, the boron nitride particles has a bulk density of at least 0.05, 0.01, 0.15, 0.03 g/$cm^3$ ranging up to about 0.60, 0.70, or 0.80 g/$cm^3$. The surface area of the boron nitride particle can be <25, <20, <10, <5, or <3 $m^2$/g. The surface area is typically at least 1 or 2 $m^2$/g.

In some embodiments, the particle size, d(0.1), of the boron nitride (e.g. platelet) particles ranges from about 0.5 to 5 microns. In some embodiments, the particle size, d(0.9), of the boron nitride (e.g. platelet) particles is at least 5 ranging up to 20, 25, 30, 35, 40, 45, or 50 microns.

Methods

The fluoropolymer compositions may be prepared by mixing the polymer, the curing agent(s), optional additives, and the fluorinated solvent. In some embodiments, the fluoropolymer is first dissolved in the fluorinated solvent and the other additives, including the curing agent(s) and electron donor compound are added thereafter.

The fluoropolymer and fluorinated curing agent can be combined in conventional rubber processing equipment to provide a solid mixture, i.e. a solid polymer containing the additional ingredients, also referred to in the art as a "compound". Typical equipment includes rubber mills, internal mixers, such as Banbury mixers, and mixing extruders. During mixing the components and additives are distributed uniformly throughout the resulting fluorinated polymer "compound" or polymer sheets. The compound is then preferably comminuted, for example by cutting it into smaller pieces and is then dissolved in the solvent.

The fluoropolymer coating solution compositions provided herein are suitable for coating substrates. The fluoropolymer coating solution compositions may be formulated to have different viscosities depending on solvent and fluoropolymer content and the presence or absence of optional additives. The fluoropolymer coating solution compositions typically contain or are solutions of fluoropolymers and may be in the form of liquids or pastes. Preferably, the compositions are liquids and more preferably they are solutions containing one or more fluoropolymer as described herein dissolved in a solvent as described herein.

The fluoropolymer compositions provided herein are suitable for coating substrates and may be adjusted (by the solvent content) to a viscosity to allow application by different coating methods, including, but not limited to spray coating or printing (for example but not limited to ink-printing, 3D-printing, screen printing), painting, impregnating, roller coating, bar coating, dip coating and solvent casting.

Coated substrates and articles may be prepared by applying the fluoropolymer compositions to a substrate and removing the solvent. The curing may occur to, during, or after removing the solvent. The solvent may be reduced or completely removed, for example for evaporation, drying or by boiling it off After removal of the solvent the composition may be characterized as "dried".

Methods of making a crosslinked fluoropolymer described herein comprise curing the fluoropolymer with (e.g. UV or e-beam) actinic irradiation. The fluoropolymer composition, substrate, or both are transmissive to the curing radiation. In some embodiments, a combination of UV curing and thermal (e.g. post) curing is utilized. The curing is carried out at an effective temperature and effective time to create a cured fluoroelastomer. Optimum conditions can be tested by examining the fluoroelastomer for its mechanical and physical properties. Curing may be carried out under pressure or without pressure in an oven. A post curing cycle at increased temperatures and or pressure may be applied to ensure the curing process is fully completed. The curing conditions depend on the curing system used.

In some embodiments, thermal curing of the fluoropolymer may optionally be carried out at lower temperatures. Post curing at lower temperatures is amenable for coating heat sensitive substrates. In some embodiments, the post curing occurs at a temperature ranging from 100, 110, 120, 130, 135 or 140° C. up to 170° C. for a period of 5-10 minutes to 24 hours. In some embodiments, the temperature is no greater than 169, 168, 167, 166, 165, 164, 163, 162, 161, or 160° C. In some embodiments, the temperature is no greater than 135, 130, 125, or 120° C. In favored embodiments, after curing the fluoropolymer is sufficiently crosslinked such that at least 80, 85, 90, 95 or 100 wt. % or greater cannot be dissolved (within 12 hours at 25° C.) in fluorinated solvent (e.g. 3-ethoxy perfluorinated 2-methyl hexane) at a weight ratio of 5 grams of fluoropolymer in 95% by weight of fluorinated solvent.

The compositions may be used for impregnating substrates, printing on substrates (for example screen printing), or coating substrates, for example but not limited to spray coating, painting dip coating, roller coating, bar coating, solvent casting, paste coating. The substrate may be organic, inorganic, or a combination thereof. Suitable substrates may include any solid surface and may include substrate selected from glass, plastics (e.g. polycarbonate), composites, metals (stainless steel, aluminum, carbon steel), metal alloys, wood, paper among others. The coating may be colored in case the compositions contains pigments, for example titanium dioxides or black fillers like graphite or soot, or it may be colorless in case pigments or black fillers are absent.

Bonding agents and primers may be used to pretreat the surface of the substrate before coating. For example, bonding of the coating to metal surfaces may be improved by applying a bonding agent or primer. Examples include commercial primers or bonding agents, for example those commercially available under the trade designation CHEMLOK.

Articles containing a coating from the compositions provided herein include but are not limited to impregnated textiles, for example protective clothing. Another example of an impregnated textile is a glass scrim impregnated with the (e.g. silica containing) fluoropolymer composition described herein. Textiles may include woven or non-woven fabrics. Other articles include articles exposed to corrosive environments, for example seals and components of seals and valves used in chemical processing, for example but not limited to components or linings of chemical reactors, molds, chemical processing equipment for example for etching, or valves, pumps and tubing, in particular for corrosive substances or hydrocarbon fuels or solvents; combustion engines, electrodes, fuel transportation, containers for acids and bases and transportation systems for acids and bases, electrical cells, fuel cells, electrolysis cells and articles used in or for etching.

An advantage of the coating compositions described herein is that the coating compositions can be used to prepare coatings or fluoropolymer sheets of high or low thickness. In some embodiments, the dried and cured fluoropolymer has a thickness of 0.1 microns to 1 or 2 mils. In some embodiments, the dried and cured fluoropolymer thickness is at least 0.2, 0.3, 0.4, 0.5, or 0.6 microns. In some embodiments, the dried and cured fluoropolymer thickness is at least 1, 2, 3, 4, 5, or 6 microns.

In typical embodiments, the dried and cured (i.e. crosslinked) composition has a low dielectric constant (Dk), typically less than 2.75, 2.70, 2.65, 2.60, 2.55, 2.50, 2.45, 2.40, 2.35, 2.30, 2.25, 2.20, 2.15, 2.20, 2.15, 2.10, 2.05, 2.00, 1.95, 1.90. In some embodiments, the dielectric constant is at least 1.90, 1.95, or 2.00. The dried and cured (i.e. crosslinked) composition has a low dielectric loss, typically less than 0.01, 0.009, 0.008, 0.007, 0.006, 0.005, 0.004, 0.003, 0.002, 0.001, 0.0009, 0.0008, 0.0007, 0.0006, 0.0005, 0.0004, 0.0003. In some embodiments, the dielectric loss is at least 0.00022, 0.00023, 0.00024, 0.00025.

The dried and cured coating can exhibit good adhesion to metals, such as copper. For example, in some embodiments, the T-peel to copper foil is at least 0.1, 0.2, 0.3, 0.4, 0.5 or 0.6 N/mm ranging up to at least 1 N/mm (i.e. 10 N/cm), 1.5 N/mm 2 N/mm or 2.5 N/mm or greater as determined by the test method described in the examples.

In some embodiments, the dried and cured coating has good hydrophobic and oleiphobic properties according to the Black Permanent Marker Resistance Test described in previously cited PCT Application No. PCT/US2019/036460, i.e. the marker fluid beads and is easy to remove with a paper towel or cloth.

In some embodiments, the dried and cured coating has good hydrophobic and oleiphobic properties, as determined by Contact Angle Measurements (as determined according to the test method described in the examples). In some embodiments, the static, advancing and/or receding contact angle with water can be at least 100, 105, 110, 115, 120, 125 and typically no greater than 130 degrees. In some embodiments, the advancing and/or receding contact angle with hexadecane can be at least 60, 65, 70, or 75 degrees.

In some embodiments, the dried and cured coating (e.g. film) exhibits low water absorption e.g. less than 0.5, 0.4, 0.3, 0.2, or 0.1 as determined by the Moisture Uptake test method described in the examples.

In some embodiments, the composition exhibits a low coefficient of thermal expansion e.g. less than 150, 100, 50, 40, 30, 20 or 10 as determined by the test method described in the examples. For some insulation layer uses the coefficient of thermal expansion is less critical and may range up to 175, 200 or 225.

As used herein the term "partially fluorinated alkyl" means an alkyl group of which some but not all hydrogens bonded to the carbon chain have been replaced by fluorine. For example, an $F_2HC$—, or an $FH_2C$— group is a partially fluorinated methyl group. Alkyl groups where the remaining hydrogen atoms have been partially or completely replaced by other atoms, for example other halogen atoms like chlorine, iodine and/or bromine are also encompassed by the term "partially fluorinated alkyl" as long as at least one hydrogen has been replaced by a fluorine. For example, residues of the formula $F_2ClC$— or FHClC— are also partially fluorinated alkyl residues.

A "partially fluorinated ether" is an ether containing at least one partially fluorinated group, or an ether that contains one or more perfluorinated groups and at least one non-fluorinated or at least one partially fluorinated group. For example, $F_2HC$—O—$CH_3$, $F_3C$—O—$CH_3$, $F_2HC$—O—$CFH_2$, and $F_2HC$—O—$CF_3$ are examples of partially fluorinated ethers. Ethers groups where the remaining hydrogen atoms have been partially or completely replaced by other atoms, for example other halogen atoms like chlorine, iodine and/or bromine are also encompassed by the term "partially fluorinated alkyl" as long as at least one hydrogen has been replaced by a fluorine. For example, ethers of the formula $F_2ClC$—O—$CF_3$ or FHClC—O—$CF_3$ are also partially fluorinated ethers.

The term "perfluorinated alkyl" or "perfluoro alkyl" is used herein to describe an alkyl group where all hydrogen atoms bonded to the alkyl chain have been replaced by fluorine atoms. For example, $F_3C$— represents a perfluoromethyl group.

A "perfluorinated ether" is an ether of which all hydrogen atoms have been replaced by fluorine atoms. An example of a perfluorinated ether is $F_3C$—O—$CF_3$.

The following examples are provided to further illustrate the present disclosure without any intention to limit the disclosure to the specific examples and embodiments provided.

Examples

Unless otherwise noted, all parts, percentages, ratios, etc. in the Examples and the rest of the specification are by weight. Unless otherwise indicated, all other reagents were obtained, or are available from fine chemical vendors such as Sigma-Aldrich Company, St. Louis, Missouri, or may be synthesized by known methods. Table 1 (below) lists materials used in the examples and their sources.

TABLE 1

Materials List

| DESIGNATION | DESCRIPTION | SOURCE |
|---|---|---|
| PFE-3 | Perfluoroelastomer latex or coagulated gum comprising a copolymer of 65.8 mol % TFE, 33 mol PMVE, 1.2 mol % of a nitrile vinylether (U.S. Pat. No. 7,019,083); As a latex, PFE = 30.5 wt. % in water with surfactant | 3M Dyneon, St. Paul, MN |
| PFA-2 | Latex (30 w % solids) comprising a polymer of TFE (97 w %), PMVE ($CF_2$═CF—O—$CF_3$, 2 w %) and $CF_2$═CF—O—$C_3F_7$ (1 w %), melting point 307° C., MFI (372° C./5 kg) 2 g/10 min; 200 nanometers | 3M Dyneon |
| TF5033 | Latex (24 wt. % solids); PTFE dispersion, particle size approximately 195 nanometers (DIN ISO 13321); obtained under the trade designation "3M DYNEON TF 5033Z" | 3M Dyneon |
| HFE-7300 | 3-Methoxy perfluorinated 4-methyl pentane obtained under the trade designation "3M NOVEC 7300" | 3M Company, St. Paul, MN |
| FS550 | Fused silica (3.5-5.2 micrometers), obtained under the trade designation "3M FUSED SILICA 550" | 3M Company |
| FS20 | Fused silica (9-16 micrometers), obtained under the trade designation "3M FUSED SILICA 20" | 3M Company |
| FG—Si | Fine ground silica (D90 = 3.5 micrometers), obtained under the trade designation "MIN-U-SIL 5" | US Silica Co., Katy, TX |
| NHDiSi | $NH(CH_2CH_2CH_2Si(OMe)_3)_2$ | Gelest, Morrisville, PA |
| TF9205 | Micropowder PTFE (average particle size approximately 8 micrometers by ISO 13320); obtained under the trade designation "3M DYNEON PTFE MICROPOWER TF 9205" | 3M Dyneon |
| $C_3F_7CO_2Me$ | $CF_3CF_2CF_2CO_2CH_3$ | Oakwood Chemical, Estill, SC |
| HFPO—Me | $F(CF(CF_3)CF_2O)_n$—$CF(CF_3)CO_2Me$ (average n is about 6), prepared according to the similar method reported in U.S. Pat. No. 3,250,808. | 3M Company |
| $HFPO(Me)_2$ | MeOC(O)—$(CF(CF_3)CF_2O)n(CF_2)_4O$—$(CF_2CF(CF_3))pCO_2Me$ (n + p is average 6), prepared according to the similar method reported in Example 4, U.S. Pat. No. 3,250,807. | 3M Company |
| C6—Si | $C_6F_{13}CH_2CH_2Si(OEt)_3$ obatined under the trade designation "DYNASYLAN F8261" | Evonik, Essen, Germany |
| HFPO—Si | $F(CF(CF_3)CF_2O)_n$—$CF(CF_3)CONH$—$CH_2CH_2CH_2Si(OMe)_3$, (molecular weight approximately 989 g/mol) | Surfactis Technologies, Angers, France |
| N3 | $NH_2[CH_2CH_2NH)]_2H$ | Sigma-Aldrich, St. Louis, MO |
| N4 | $NH_2[CH_2CH_2NH]_3H$ | Sigma-Aldrich |
| N5 | $NH_2[CH_2CH_2NH]_4H$ | Sigma-Aldrich |

TABLE 1-continued

| Materials List | | |
|---|---|---|
| DESIGNATION | DESCRIPTION | SOURCE |
| N6 | $NH_2[CH_2CH_2NH]_5H$ | Sigma-Aldrich |
| N2Si | $NH_2CH_2CH_2NHCH_2CH_2CH_2Si(OMe)_3$ | Gelest |
| N3Si | $NH_2[CH_2CH_2NH]_2CH_2CH_2CH_2Si(OMe)_3$ | Gelest |
| PFA Film | Fluoropolymer film | DuPont |

Test Methods

Water Absorption Measurement Test Method

Water absorption measurements were made using a Q500SA (TA Instruments, Inc., New Castle, DE) vapor absorption analysis instrument. The sample was placed in a quartz pan located inside a programmable chamber. Approximately 5 milligram (mg) of sample was used for each measurement. The samples were first dried in the chamber until the weight did not change over 20 minutes. Then the samples were placed under 60° C. and 50% relative humidity (RH) conditions until weight equilibrium was achieved.

Dk/Df Measurement Test Method

All Dk/Df measurements were performed in accordance with the standard IEC 61189-2-721 near a frequency of 25 GHz or 34 GHz, or both.

Curing or Crosslinking Test Method

The resulting thermally treated (140° C. for 2 hours) coating samples were cut, weighed ($W_0$), and placed in a vial. A large amount of HFE-7300 was added (the weight ratio of HFE to Wo is >98/2). The sealed vial was then shaken overnight at room temperature. An initial crosslinking test result of "Not cured" means the thermally treated coating dissolved and resulted in a hazy solution since the white fluorinated polymer fillers dispersed throughout the HFE after the PFE binder dissolved. A crosslinking test result of "Cured" means the thermally treated coating did not dissolve and the final solution was clear since the white fluorinated polymer fillers were still locked in the PFE binder which did not dissolve in the HFE solvent. To obtain the curing yield, the "cured" samples were taken out from HFE-7300 solvent after shaken overnight, dried in 100° C. oven for 1 hour, and then weighed (W). Curing yield was calculated by the following equation:

$$\text{Yield } \% = [1-(W_0-W)/W_0]\ 100\%$$

Moisture Uptake Test Method

Water absorption measurements were made using a vapor absorption analysis instrument Q500SA from TA Instruments. The sample was placed in a quartz pan located inside a programmable chamber. Approximately 5 milligrams (mg) of sample was used in each measurement. The samples were first dried in the chamber until the weight remained unchanged over 20 minutes. Then the samples were placed under 60° C. and 50% humidity conditions until weight equilibrium was achieved. The water absorption value was calculated based on the weight increase/original weight of the sample.

Coefficient of Thermal Expansion (CTE) Test Method

CTE measurements were conducted using a Thermomechanical Analyzer (TMA) Q400 from TA Instruments (New Castle, DE). The film samples were cut into rectangle shapes (4.5 millimeters (mm)×24 mm) and mounted on the tension clamp. The samples were heated to at least 150° C. using a ramp rate of 3.00° C./minute and then cooled to room temperature at the same rate. Then the samples were heated again to the target temperature. The CTE calculated from the second cycle was reported.

T-Peel Test Method

Perfluoropolymer composite films were obtained by coating the solutions on a 3M release liner (precoated with a fluorinated release coating) with a No. 24 Meyer rod. The obtained coatings were then dried in a 100° C. oven to remove solvents. The films were then separated from the liners and placed into an aluminum tray and heated at 160-165° C. for 20 minutes.

Films were laminated with 2 pieces of Cu foil (one on the bottom and one on the top) to obtain sandwich structures with perfluoropolymer composite films in the middle. Then the laminated sheets were heated at 200° C. for 10-20 minutes between heated platens of a Wabash MPI (Wabash, IN) hydraulic press and immediately transferred to a cold press. After cooling to room temperature by cold pressing, the resulting sample was subjected to T-peel measurement.

The laminated samples were pressed and cut into strips with 1 centimeter (cm) width for T-peel measurement. The measurement was conducted using an Instron electromechanical universal testing machine (Instron Corp., Norwood, MA) using ASTM D1876 standard method for "Peel Resistance of Adhesives," more commonly known as the "T-peel" test. Peel data was generated using an Instron™ model 1125 tester (Instron Corp.) equipped with a Sintech Tester 20 (MTS Systems Corporation, Eden Prairie, MN).

Examples

Preparation of Fluorinated Crosslinkers

In all examples, Rf (also referred to as HFPO) is a perfluoropolyether group, $F(CF(CF_3)CF_2O)_nCF(CF_3)$— with average n of 6, or a divalent perfluoropolyether group, —$(CF(CF_3)CF_2O)_n$—$(CF_2)_4O$—$(CF_2CF(CF_3))_o$— with an average n+o=6 or short $CF_3CF_2CF_2$— group.

HFPO—N3, Rf—$CONHCH_2CH_2NHCH_2CH_2NHC(O)$—Rf and Rf—$CO(NHCH_2CH_2)NH_2$ (in 80/20 mole ratio): Made from HFPO-Me and N3 in 1.8/1 mole ratio according to the similar procedure described in U.S. Pat. No. 7,288,619.

HFPO—$CO_2Me$ (1.8 mol)+
$NH_2CH_2CH_2NHCH_2CH_2NH_2$ (1 mol)
→HFPO—C(O)—
$NHCH_2CH_2NHCH_2CH_2NH$—C(O)—HFPO
(0.8 mol)+HFPO—C(O)—
$NHCH_2CH_2NHCH_2CH_2NH_2$ (0.2 mol)

HFPO—N4, Rf—$CONH[CH_2CH_2NH]_2CH_2CH_2NHC(O)$—Rf: Made from HFPO-Me and N4 in 2/1 mole ratio according to the similar procedure described in U.S. Pat. No. 7,288,619.

HFPO—N6, Rf—CONH$[CH_2CH_2NH]_4CH_2CH_2$NHC(O)—Rf: Made from HFPO-Me and N6 in 2/1 mole ratio according to the similar procedure described in U.S. Pat. No. 7,288,619.

HFPO—NSi, Rf—$CONHCH_2CH_2NHCH_2CH_2CH_2$—Si$(OMe)_3$: Made from HFPO-Me and $NH_2CH_2CH_2NHCH_2CH_2CH_2Si(OMe)_3$ in 1/1 mole ratio according to the similar procedure described in U.S. Pat. No. 7,288,619.

HFPO—N2Si, Rf—CONH$[CH_2CH_2NH]_2$ $CH_2CH_2CH_2$—$Si(OMe)_3$: Made from HFPO-Me and $NH_2$ $[CH_2CH_2NH]_2CH_2CH_2CH_2Si(OMe)_3$ in 1/1 mole ratio according to the similar procedure described in U.S. Pat. No. 7,288,619.

HFPO—$(NSi)_2$, $(MeO)_3Si(CH_2)_3NHCH_2CH_2NHC(O)$—Rf—$C(O)NHCH_2CH_2NH$—$(CH_2)_3Si(OMe)_3$: Made from $HFPO(Me)_2$ and $NH_2CH_2CH_2NHCH_2CH_2CH_2Si(OMe)_3$ in 1/2 mole ratio according to the similar procedure described in U.S. Pat. No. 7,288,619.

$C_3F_7$—$N5C_3F_7$, $C_3F_7CONH[CH_2CH_2NH]_4C(O)C_3F_7$: Made from $C_3F_7CO_2Me$ and $NH_2[CH_2CH_2NH]_4H$ (N5) in 2/1 mole ratio according to the similar procedure described in U.S. Pat. No. 7,288,619.

$C_3F_7$—NSi, $C_3F_7CONHCH_2CH_2NHCH_2CH_2CH_2Si(OMe)_3$: Made from $C_3F_7CO_2Me$ and $NH_2CH_2CH_2NHCH_2CH_2CH_2Si(OMe)_3$ (N2Si) in 1/1 mole ratio according to the similar procedure described in U.S. Pat. No. 7,288,619.

$C_3F_7$—N2Si, $C_3F_7CO(NHCH_2CH_2)_2NHCH_2CH_2CH_2Si(OMe)_3$: Made from $C_3F_7CO_2Me$ and $NH_2[CH_2CH_2NH]_2$ $CH_2CH_2CH_2Si(OMe)_3$ (N3Si) in 1/1 mole ratio according to the similar procedure described in U.S. Pat. No. 7,288,619.

Crosslinker Solubility Test

Since the fluoropolymer coating is in HFE solvent, the solubility of crosslinkers in HFE-7300 at 10 wt. % was tested by vigorous mixing via vortexing for about 2 minutes for potential compatibility in the coating formulations. Solubility results are summarized in Table 2, below. Non-fluorinated crosslinker, NHDiSi, was used as a comparison.

TABLE 2

| EXAMPLE | CROSSLINKER | SOLUBILITY RESULTS OF 10 WT. % FLUORINATED CROSSLINKER IN HFE-7300 |
|---|---|---|
| CE-A | NHDiSi (Control) | Not soluble - initial haze after mixing, then phase separated |
| CE-B | 2,2-bis-(3-amino-4-hydroxyphenyl)-hexafluoropropane (CAS#83558-87-6) | Not soluble at 0.073 to 5 wt. %. Thus, also not soluble at higher concentrations (e.g. 10 wt-%) |
| EX-1 | HFPO—N3 | Soluble - clear and homogenous solution |
| EX-2 | HFPO—N4 | Soluble - clear and homogenous solution |
| EX-3 | HFPO—N6 | Soluble - clear and homogenous solution |
| EX-4 | HFPO—NSi | Soluble - clear and homogenous solution |
| EX-5 | HFPO—N2Si | Soluble - clear and homogenous solution |
| EX-6 | HFPO—(NSi)2 | Soluble - clear and homogenous solution |
| EX-7 | $C_3F_7$—$N5C_3F_7$ | Not soluble - initial haze, then fast phase separated |
| EX-8 | $C_3F_7$—NSi | Soluble - clear and homogenous solution |
| EX-9 | $C_3F_7$—N2Si | Not soluble - initial haze, then fast phase separated |

From Table 2, the presence of fluorine in the crosslinkers made them more soluble in fluorinated solvent, which indicates better possible compatibility in HFE-7300 based coating formulations.

Compounded Fluoropolymers (CFP) with Inorganic Fillers

Compounded fluoropolymers (CFP) were prepared by combining perfluoroelastomer and inorganic fillers in according to the ratios described below using conventional rubber processing equipment to provide well-mixed, solid gums.

CFP-1 Compounded PFE-3 with FS550 at 70/30 by weight.

CFP-2 Compounded PFE-3 with FS20 at 70/30 by weight.

CFP-3 Compounded PFE-3 with FG-Si at 70/30 by weight.

CFP-4 Compounded PFE-3 with FG-Si at 50/50 by weight.

Co-Coagulated Fluoropolymers (CCFP) with Nano-Perfluoroplastic Fillers

CCFP-1: PFE-3/PFA-2 (70/30):

Perfluoroelastomer PFE-3 latex (30.5 wt. %, 3M Dyneon) was mixed with perfluoroplastic PFA-2 latex (50 wt. % PFA-2 latex, 3M Dyneon) in a bottle at a 70:30 ratio. The bottle was placed on a roller and mixed for 20 minutes, and then was placed in an approximately 0° C. fridge overnight to coagulate the mixed solids. After warming to room temperature, the precipitate was filtered and washed with deionized water for 3 times to remove latex surfactants. The obtained co-coagulated solid was dried in an air-circulated oven at 60° C. overnight. CCFP-1 was used to prepare the perfluoropolymer solution for coating PFES-10, below.

CCFP-2: PFE-3/TF5033 (70/30):

Perfluoroelastomer PFE-3 latex (30.5 wt. %, 3M Dyneon) was mixed with perfluoroplastic TF5033 latex (24 wt. %, 3M Dyneon) in a bottle at a 70:30 ratio. The bottle was placed on a roller and mixed for 20 minutes, and then was placed in an approximately 0° C. fridge overnight to coagulate the mixed solids. After warming to room temperature, the precipitate was filtered and washed with deionized water for 3 times to remove latex surfactants. The obtained co-coagulated solid was dried in an air-circulated oven at 60° C. overnight. CCFP-2 was used to prepare the perfluoropolymer solution for coating PFES-11, below.

Preparation of Perfluoropolymer Solutions (PFES) for Coating

PFES-1: A 5% perfluoroelastomer (PFE-3) solution in HFE was prepared in a sealed jar from 10 grams (g) PFE-3 gum (cut into small pieces) and 190 g HFE-7300 by rolling overnight at room temperature. The result was a clear, homogeneous solution with moderate viscosity.

PFES-2: A 10% dispersion solution of PFE-3/FS550 (70/30 by weight) in HFE-7300 was prepared in a sealed jar from 14 g PFE-3 gum (cut into small pieces) and 6 g FS550 in 186 g HFE-7300 by rolling overnight at room temperature.

PFES-3: A 10% CFP-1 dispersion solution in HFE-7300 was prepared in a sealed jar from 20 g CFP-1 gum (PFE-3/FS550=70/30, cut in small pieces) and 180 g HFE-7300 by constantly shaking overnight at room temperature.

PFES-4: A 10% CFP-2 dispersion solution in HFE-7300 was prepared in a sealed jar from 20 g CFP-2 gum (PFE-3/FS20=70/30, cut in small pieces) and 180 g HFE-7300 by constantly shaking overnight at room temperature.

PFES-5: A 10% CFP-3 dispersion solution in HFE-7300 was prepared in a sealed jar from 20 g CFP-3 gum (PFE-3/FG-Si=70/30, cut in small pieces) and 180 g HFE-7300 by constantly shaking overnight at room temperature.

PFES-6: A 10% CFP-4 dispersion solution in HFE-7300 was prepared in a sealed jar from 20 g CFP-4 gum (PFE-3/FG-Si=50/50, cut in small pieces) and 180 g HFE-7300 by constantly shaking overnight at room temperature. The resulting solution was a stable dispersion with moderate viscosity.

PFES-7: A 10% of dispersion solution of PFE-3/TF9205/FS550 (32/53/15 by weight) in HFE-7300 was prepared in a sealed jar from 6.4 g PFE-3 gum (cut into small pieces), 10.6 g TF9205 and 3.0 g FS550 in 186 g HFE-7300 by rolling overnight at room temperature.

PFES-8: A 10% of dispersion solution of PFE-3/TF9205/FS550 (32/48/20 by weight) in HFE-7300 was prepared in a sealed jar from 6.4 g PFE-3 gum (cut into small pieces), 9.6 g TF9205 and 4.0 g FS550 in 186 g HFE-7300 by rolling overnight at room temperature.

PFES-9: A 10% of dispersion solution of PFE-3/TF9205/FS550 (32/43/25 by weight) in HFE-7300 was prepared in a sealed jar from 6.4 g PFE-3 gum (cut into small pieces), 9.6 g TF9205 and 4.0 g FS550 in 186 g HFE-7300 by rolling overnight at room temperature.

PFES-10: A 10% CCFP-1 dispersion solution in HFE was prepared in a sealed jar from 20 g CCFP-1 and 180 g HFE-7300 by constantly shaking overnight at room temperature.

PFES-11: A 10% dispersion solution of CCFP-2 was prepared in a sealed jar from 17 g CCFP-2 (PFE-3/TF5033=70/30) and 3 g FS550 in 180 g HFE-7300 by constantly shaking overnight at room temperature.

Preparation of Perfluoropolymer Test Samples and Curing Results

The final coating solutions were formulated in a bottle by adding different crosslinkers to the above PFES solutions (5% or 100 solution in HFE-7300) in designed wt. % based on the total weight of solids, and fully mixed for approximately 2 minutes via Vortex at 2500 resolutions per minute (RPM) before coating.

Test samples for Tables 3, 4, and 5 were prepared by coating the coating solutions on different substrates, such as clear FEP film, PFA film, glass, aluminum dish, or release liner, at different thicknesses. Coatings were dried at room temperature to remove most solvent, then thermally treated or cured in a 140° C. oven for 2 hours for testing. "Not cured" means the thermally treated samples were still soluble in HFE solvent since no crosslinker, and "Cured" means the thermally treated samples in the presence of crosslinkers were insoluble in HFE solvent. The curing test results are summarized in Table 3.

TABLE 3

| EXAMPLE | COATING FORMULATION | CURING RESULT AFTER 140° C. FOR 2 HOURS |
|---|---|---|
| EX-10 | PFES-1 + 5% HFPO/N3 | Cured |
| EX-11 | PFES-1 + 5% HFPO/N4 | Cured |
| EX-12 | PFES-1 + 5% HFPO/N6 | Cured |
| EX-13 | PFES-1 + 5% HFPO(—NSi)2 | Cured |
| EX-14 | PFES-1 + 5% $C_3F_7$—N5$C_3F_7$ | Cured |
| EX-15 | PFES-1 + 5% $C_3F_7$—NSi | Cured |
| EX-16 | PFES-1 + 5% $C_3F_7$—N2Si | Cured |
| EX-17 | PFES-2 + 3% HFPO—NSi | Cured |
| EX-18 | PFES-2 + 3% HFPO—N2Si | Cured |
| EX-19 | PFES-2 + 3% HFPO—(NSi)2 | Cured |
| EX-20 | PFES-2 + 3% HFPO/N4 | Cured |
| EX-21 | PFES-3 + 5% HFPO—(NSi)2 | Cured |
| EX-22 | PFES-3 + 5% HFPO—N2Si | Cured |
| EX-23 | PFES-4 + 5% HFPO—N2Si | Cured |
| EX-24 | PFES-4 + 5% HFPO—NSi | Cured |
| EX-25 | PFES-5 + 5% HFPO—NSi | Cured |
| EX-26 | PFES-5 + 5% HFPO—N2Si | Cured |
| EX-27 | PFES-6 + 5% HFPO—N2Si | Cured |
| EX-28 | PFES-6 + 5% HFPO—NSi | Cured |
| EX-29 | PFES-6 + 5% HFPO—(NSi)2 | Cured |
| EX-30 | PFES-7 + 2% HFPO—NSi | Cured |
| EX-31 | PFES-8 + 2% HFPO—NSi | Cured |
| EX-32 | PFES-9 + 2% HFPO—NSi | Cured |
| EX-33 | PFE-10 + 2% NHDiSi + 3% $C_3F_7$—NSi | Cured |
| EX-34 | PFE-10 + 2% NHDiSi + 3% HFPO—NSi | Cured |
| EX-35 | PFES-10 + 5% $C_3F_7$—N5$C_3F_7$ | Cured |
| EX-36 | PFES-10 + 5% $C_3F_7$—NSi | Cured |
| EX-37 | PFES-10 + 5% C3F7—N2Si | Cured |
| EX-38 | PFES-11 + 2% HFPO—NSi | Cured |

From Table 3, without crosslinker, the coatings were not cured after 2 hours at 140° C. In the presence of fluorinated crosslinker, all coatings were cured under the same conditions similar to that in the presence of non-fluorinated crosslinker.

The curing yield from representative examples was measured and calculated (as described above), and the results are summarized in Table 4.

TABLE 4

| EXAMPLE | COATING FORMULATION | CURING YIELD |
|---|---|---|
| EX-33 | PFE-10 + 2% NHDiSi + 3% $C_3F_7$—NSi | 96.2% |
| EX-34 | PFE-10 + 2% NHDiSi + 3% HFPO—NSi | 96.4% |

Crosslinker Effect on Dk and Df

Dk and Df values were measured from representative samples of formulations with fluorinated crosslinkers (F-X) in comparison with known non-fluorinated crosslinkers (H-X). Results are summarized in Table 5.

TABLE 5

| EXAMPLE | COATING FORMULATION | Dk AT 25 GHz | Df AT 25 GHz | Df AT 34 GHz |
|---|---|---|---|---|
| EX-10 | PFES-1 + 5% HFPO/N3 | 2.10 | 0.0017 | 0.0020 |
| EX-11 | PFES-1 + 5% HFPO/N4 | 2.01 | 0.0014 | 0.0014 |
| EX-12 | PFES-1 + 5% HFPO/N6 | 2.03 | 0.0015 | 0.0016 |
| EX-13 | PFES-1 + 5% HFPO—(N—Si)2 | 2.09 | 0.0014 | 0.0022 |
| EX-16 | PFES-1 + 5% $C_3F_7$—N2Si | 2.13 | 0.0019 | |
| EX-17 | PFES-2 + 3% HFPO—NSi | | 0.0009 | |
| EX-18 | PFES-2 + 3% HFPO—N2Si | | 0.0009 | |
| EX-19 | PFES-2 + 3% HFPO—(NSi)2 | | 0.0006 | |
| EX-20 | PFES-2 + 3% HFPO/N4 | | 0.0010 | |
| EX-21 | PFES-3 + 5% HFPO—(NSi)2 | | 0.0014 | |
| EX-22 | PFES-3 + 5% HFPO—N2Si | | 0.0016 | |
| EX-23 | PFES-4 + 5% HFPO—N2Si | | 0.0014 | |
| EX-24 | PFES-4 + 5% HFPO—NSi | | 0.0013 | |
| EX-25 | PFES-5 + 5% HFPO—NSi | 2.17 | 0.0021 | 0.0023 |
| EX-26 | PFES-5 + 5% HFPO—N2Si | 2.18 | 0.0020 | 0.0022 |
| EX-28 | PFES-6 + 5% HFPO—NSi | | 0.0023 | |
| EX-30 | PFES-7 + 2% HFPO—NSi | 2.04 | 0.0009 | |
| EX-31 | PFES-8 + 2% HFPO—NSi | 2.08 | 0.00096 | |
| EX-32 | PFES-9 + 2% HFPO—NSi | 2.14 | 0.0010 | |
| EX-34 | PFE-10 + 2% NHDiSi + 3% HFPO—NSi | 2.15 | 0.0016 | |
| EX-35 | PFES-10 + 5% $C_3F_7$—N5$C_3F_7$ | 2.11 | 0.0021 | |
| EX-36 | PFES-10 + 5% $C_3F_7$—NSi | 2.13 | 0.0021 | |
| EX-37 | PFES-10 + 5% $C_3F_7$—N2Si | 2.17 | 0.0022 | |
| EX-38 | PFES-11 + 2% HFPO—NSi | 2.08 | 0.0012 | |

Crosslinker Effect on Moisture Uptake

Moisture uptake was measured from representative samples with fluorinated crosslinkers (F-X) in comparison with those having known non-fluorinated crosslinkers (H-X). Results are summarized in Table 6.

TABLE 6

| EXAMPLE | MOISTURE UPTAKE 5%-95% RH AT 23° C., wt. % | COEF. OF HYGROSCOPIC ABSORPTION AT 23° C., ppm / % RH | DIFFUSION RATE AT 23° C., $g^2$/second | COEF. OF THERMAL EXPANSION $2^{ND}$ HEAT, μm/(m · ° C.) |
|---|---|---|---|---|
| EX-21 | 0.08 | 14.3 | 1.44E−08 | 131 |
| EX-22 | 0.08 | 9.0 | 3.81E−08 | 148 |
| EX-23 | 0.08 | 8.4 | 1.99E−08 | 152 |
| EX-24 | 0.08 | 9.0 | 4.00E−08 | 177 |
| EX-30 | 0.04 | 3.9 | 4.13E−08 | 138 |
| EX-31 | 0.04 | 10.8 | 3.58E−08 | 141 |
| EX-32 | 0.04 | 4.9 | 3.93E−08 | 151 |

Crosslinker Effect on Coefficient of Thermal Expansion

Coefficient of thermal expansion from representative examples was measured from formulations with fluorinated crosslinkers (F-X) in comparison with the formulations with non-fluorinated crosslinkers (H-X). Results are summarized in Table 6, which showed no significant difference even though the use of high molecular weight fluorinated cross-linker may reduce the numbers of active crosslinker atoms.

In addition, the adhesion of film sample EX-32 was studied by hot pressing the film between two pieces of copper foil at 200° C. for 30 minutes, and the peel test showed 10.2 N/cm, indicating reasonable adhesion.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

The invention claimed is:

1. An electronic telecommunication article comprising a crosslinked fluoropolymer layer comprising the reaction product of a fluoropolymer and a fluorinated curing agent; wherein the fluorinated curing agent has the formula:

$$Rf\text{-}[L^1\text{-}(NR^1R^2)_n\text{-}NHR^3]_p$$

wherein:

Rf is a (per)fluorinated group;

$L^1$ is a divalent linking group or a covalent bond;

$R^1$ is independently hydrogen, an alkyl group having from 1 to 8 carbon atoms, an aminoalkyl group having from 2 to 8 carbon atoms, a hydroxyalkyl group having from 2 to 8 carbon atoms, or $-L^1Rf$;

$R^2$ independently represents an alkylene group having from 2 to 8 carbon atoms;

$R^3$ is hydrogen, an alkyl group having 1 to 4 carbon atoms, or $-L^1Rf$;

n is at least 1; and p is 1 or 2;

or the fluorinated curing agent has the formula $$Rf^1[L^3\text{-}(NR^1R^2)_n\text{-}SiR^4m(OR^5)_{3\text{-}m}]_p$$

wherein $Rf^1$ is a (per)fluroinated group;

$L^3$ is independently a divalent linking group or a covalent bond;

$R^1$ is independently H, an alkyl group having from 1 to 8 carbon atoms, an aminoalkyl group having from 2 to 8 carbon atoms, a hydroxyalkyl group having from 2 to 8 carbon atoms, or $-L^1Rf$;

$R^2$ independently represents an alkylene group having from 2 to 8 carbon atoms;

$R^4$ is independently alkylene, arylene, or a combination thereof;

$R^5$ is hydrogen, an alkyl group having 1 to 4 carbon atoms;

n is at least one;

m is 0 or 1; and p is 1 or 2.

2. The electronic telecommunication article of claim 1 wherein the crosslinked fluoropolymer layer is a substrate, patterned layer, insulating layer, passivation layer, cladding, protective layer, or a combination thereof.

3. The electronic telecommunication article of claim 1 wherein the article is an integrated circuit, a printed circuit board, or an antenna.

4. The electronic telecommunication article of claim 1 wherein the fluoropolymer comprises polymerized units of tetrafluoroethene and one or more unsaturated perfluorinated alkyl ethers.

5. The electronic telecommunication article of claim 1 wherein the fluorinated curing agent comprises a HFPO group.

6. The electronic telecommunication article of claim 1 wherein the fluorinated curing agent has a fluorine content of at least 46%, a ratio of fluorinated segment molecular weight (WRf) to hydrocarbon molecular weight (WRh), WRf/WRh of greater than 1.4, or a combination thereof.

7. The electronic telecommunication article of claim 1 wherein the fluorinated curing agent comprises one or more alkoxy silane groups.

8. The electronic telecommunication article of claim 1 wherein the fluorinated curing agent has a fluorine content of greater than 29%, a ratio of fluorinated segment molecular weight (WRf) to hydrocarbon molecular weight (WRh), WRf/WRh is at least 0.7, or a combination thereof.

9. The electronic telecommunication article of claim 1 wherein at least one $R^1$ is hydrogen.

10. The electronic telecommunication article of claim 1 wherein the fluorinated curing agent is soluble in a fluorinated solvent.

11. The electronic telecommunication article electronic telecommunication article of claim 10 wherein the fluorinated solvent is a partially fluorinated ether.

* * * * *